United States Patent [19]

Arciszewski et al.

[11] Patent Number: 4,938,980
[45] Date of Patent: Jul. 3, 1990

[54] LOW SODIUM CAKE MIX AND PROCESS OF PREPARING LOW SODIUM CAKE

[75] Inventors: Henry Arciszewski, Franklin Lakes; Linda A. Porzio, Kinnelon; Bin Y. Chiang, Cedar Knolls; Clyde E. Spotts, Jr., Ridgewood, all of N.J.

[73] Assignee: Nabisco Brands, Inc., East Hanover, N.J.

[21] Appl. No.: 325,031

[22] Filed: Mar. 16, 1989

Related U.S. Application Data

[63] Continuation of Ser. No. 917,897, Oct. 10, 1986, abandoned, which is a continuation-in-part of Ser. No. 584,868, Feb. 29, 1984, abandoned, which is a continuation-in-part of Ser. No. 480,431, Mar. 30, 1983, abandoned, which is a continuation-in-part of Ser. No. 773,927, Sep. 6, 1985, abandoned, which is a continuation-in-part of Ser. No. 584,868, Feb. 27, 1986, abandoned, which is a continuation-in-part of Ser. No. 480,431, Mar. 30, 1983, abandoned.

[51] Int. Cl.$^5$ .................. A21D 8/00; A21D 2/00; A21D 10/00

[52] U.S. Cl. .................. 426/553; 426/554; 426/804; 426/653

[58] Field of Search .............. 426/561, 562, 563, 653, 426/555, 804, 14–21, 26, 27, 551, 553, 554

[56] References Cited

U.S. PATENT DOCUMENTS

| | | | |
|---|---|---|---|
| 2,810,650 | 10/1957 | Joslin | 426/551 |
| 3,297,449 | 1/1967 | Baker et al. | 426/551 |
| 3,632,355 | 1/1972 | Umina et al. | 426/551 |

Primary Examiner—Marianne Cintins

[57] ABSTRACT

A cake mix for making a low sodium cake, which has good volume, fine texture, good flavor, pleasant mouth feel and uniform color. A nonshortening portion and a shortening portion are combined with a baking powder portion that has balanced amounts of potassium carbonate and monocalcium phosphate to produce a final cake batter. The final cake batter is baked to produce a cake having a final pH of about 6.8 to 7.5 and having a sodium content of less than 35 mgs per serving.

18 Claims, No Drawings

LOW SODIUM CAKE MIX AND PROCESS OF PREPARING LOW SODIUM CAKE

This application is a continuation of application Ser. No. 917,897, filed Oct. 10, 1986, now abandoned, which is a continuation-in-part of application Ser. No. 773,127, filed Sept. 6, 1985, now abandoned. The aforementioned application Ser. No. 917,897 is also a continuation-in-part of application Ser. No. 584,868, filed Feb. 29, 1984, now abandoned. The aforementioned application Ser. No. 773,127 is itself a continuation-in-part of the aforementioned application Ser. No. 584,868, and the aforementioned application Ser. No. 584,868 is itself a continuation-in-part of application Ser. No. 480,431, filed Mar. 30, 1983, now abandoned.

BACKGROUND OF THE INVENTION

1. Field of the Invention

The invention relates to the production of cakes, such as, sponge cakes, white layer cakes, muffins and doughnuts, starting with low sodium cake mixes as the precursors. The invention also relates to low sodium cake mixes and low sodium cakes.

2. Background of the Invention

The three usual sources of sodium in cakes are (i) salt, (ii) the basic leavening agent, such as, sodium bicarbonate, and (iii) the acidic leavening agent.

Cakes are usually leavened by carbon dioxide originating from added sodium bicarbonate (baking soda). When soda is added alone, it tends to make the dough alkaline, leading to flavor deterioration and discoloration, and the carbon dioxide is released very slowly. The addition of an acid along with the soda promotes a vigorous evolution of gas and keeps the dough pH near neutrality. The rate of gas release from solution controls the size of the bubbles in the dough and consequently influences the grain, volume and texture of the finished product. The most successful leavening acids have been cream of tartar (potassium acid tartrate), sodium aluminum sulfate (alum), sodium acid pyrophosphate and various forms of calcium phosphate.

DeMan, John M., "Principles Of Food Chemistry", (1980), p. 408, teaches that chemical leavening agents, which contain acids such as potassium acid tartrate, sodium aluminum phosphate, tartaric acid, monocalcium phosphate and sodium acid pyrophosphate, are used in a variety of foods. The Merck Index Of Chemicals And Drugs, 6th Ed., (1952), p. 190, discloses the use of $CaH_4(PO_4)_2$ in combination with sodium bicarbonate as a baking powder.

Matz, Samuel A., "Cereal Technology", (1970), p. 49, states that the chemical formulas of leavening acids do not adequately define their function in doughs. According to Matz, small amounts of additives included in doughs during manufacture can have a profound effect on the rate of reaction of a leavening acid. Granule size and form also have important modifying actions.

Johnson, Arnold H., et al., "Encyclopedia Of Food Technology", (1974) p. 547, teaches that potassium hydrogen tartrate, i.e., cream of tartar, is a fast-acting baking acid, whereby the leavening gas is liberated chiefly during the mixing of the batter. The oven spring, i.e., expansion in the oven, is derived mainly from expansion of the preformed bubbles in the batter. The bench tolerance of such type of leavener is not suited for commercial bakery operations where machines are involved and there may be delays between mixing the batter and baking. Another fast-acting acid is monocalcium phosphate monohydrate, which is a more efficient leavener on a weight basis than is cream of tartar and does not react quite so rapidly in the batter. Anhydrous monocalcium phosphate has improved bench tolerance in that a portion of it is slow to dissolve in the batter and consequently has more oven spring.

Most commercial baking powders are of the double-action type, i.e., they give off a small amount of the available carbon dioxide during the mixing and make-up stages and then remain relatively quiescent until the temperature begins to rise after the batter is placed in the oven. Such type of action insures that an excessive loss of leavening gas will not occur if the baker finds it necessary to leave the batter in an unbaked condition for long periods.

U.S. Pat. No. 2,228,729 teaches preparation of a health bread using potassium carbonate and ammonium carbonate as the leavening agents. The bread produced is disclosed as being free of greenish color and hue and as having a fine whitish interior. To reduce the amount of chemical leavening agents, a large percentage of eggs is used that creates an expanding force upon heating. No fermentation is disclosed, although a sponge is produced.

U.S. Pat. No. 315,381 also discloses a baking powder for leavening dough wherein magnesium carbonate can be substituted for sodium bicarbonate, in whole or in part; the latter preferably and this agent is used in combination with either metaphosphoric or pyrophosphoric acid.

U.S. Reissue Pat. No. 2,979 teaches the use of a baking powder composition that included a dry alkaline carbonate either sodium or potassium, a calcium acid phosphate, and a farinaceous material such as flour. This composition is disclosed as being used in the production of cake or bread without a fermentation agent.

U.S. Pat. No. 673,057 also teaches a baking powder that comprises either sodium or potassium bicarbonate-carbonate in combination with monocalcium phosphate which is maintained stable by the addition of an insoluble calcium phosphate. The example indicated is for use in bread making.

U.S. Pat. No. 4,277,504 is specifically directed to a cake mix. The patent does teach preferably the use of potassium bicarbonate vis a vis sodium bicarbonate and an acidic component preferably glucono-deltalactone, although other acids may be used such as calcium acid monophosphate, sodium aluminum phosphate (acidic), tartaric acid, citric acid, etc. The essence of the patent, however, is the presentation of sweetness of a high fructose corn syrup used in baking a dietetic cake. Fructose is said to lose much of its sweetness when the cake batter is heated. By a combination of ingredients that includes flour, fructose, emulsifiers and baking powder having glucono-delta-lactone as the acidic component, the sweetness is maintained, despite the fact that the pH of the resultant cake falls within the range of 3.5 to 5.5. As a matter of fact, an acidic pH is mandatory in the patent as pointed out by Matz, Samuel A. "Cookie and Cracker Technology", (1968), at page 77, which states that potassium bicarbonate is very hygroscopic and tends to impart a bitter flavor in the foods in which it is used. Furthermore, potassium bicarbonate is very expensive. Matz teaches away from the use of carbonates because their very high alkalinity tends to result in localized areas of very high alkalinity which is formed as the carbonate granules dissolve in the batter. These localized areas lead to undesirably colored and flavored products.

While sodium bicarbonate is the most widely-used chemical leavening agent, many other compositions for producing carbon dioxide gas in foods without the use of sodium bicarbonate are known. While replacement of sodium chloride with potassium chloride can be beneficial to the health, it would not serve the function of neutralizing the acids produced in forming a dough and it would not leaven the cake dough. In using ammonium bicarbonate alone as a replacement for sodium bicarbonate, neutralization of the produced acids becomes a problem. The release of both ammonia and carbon dioxide makes pH control of the final cake product difficult.

The label of "White Cake Mix" distributed by Estee Corporation lists the following ingredients: fructose, enriched wheat flour (containing niacin, reduced iron, thiamine mononitrate and riboflavin), modified wheat starch, powdered cellulose, dried egg white, modified corn starch, propylene glycol monoesters and diesters of fatty acids, monoglycerides, diglycerides, monocalcium phosphate, potassium bicarbonate, potassium chloride and artificial flavor. The label bears the copyright date of 1980.

U.S. Pat. No. 3,297,449 (Baker et al.) discloses a preleavened packaged dough composition containing flour, water and leavening. The leavening is composed of about 1.4 percent to about 2.1 percent by weight of the dough of sodium acid pyrophosphate and a blend of sodium and potassium bicarbonate salts sufficient to at least substantially neutralize the pyrophosphate. The blend of sodium and potassium bicarbonate salts contains from about 20 mol percent to about 70 mol percent potassium salt. The preleavened packaged dough exhibits during storage a substantial reduction in both the occurrence and size of orthophosphate crystals. Potassium carbonate or potassium chloride can be used in place of all or part of potassium bicarbonate. Baker et al. states that substitution of potassium bicarbonate for sodium bicarbonate, even at the 100 percent level, has not been found to contribute objectionably to the flavor of the final product.

U.S. Pat. No. 4,277,127 (Radlove) is a continuation-in-part of U.S. Pat. No. 4,277,504 (Radlove); U.S. Pat. No. 4,379,174 (Radlove) is a continuation-in-part of the first listed patent.

Braaksma, E., et al., Brot and Geback, (March 1964), Vol. 3, pages 41 to 48, discloses the use of calcium carbonate.

Patt, V.A., et al., "Process For Preparing Wheat Samples For Breadmaking", Food Science Technology Abstract (1980), No. 719,584, deals with the making of special bread.

Terada M., et al., Agri., and Biol. Chemistry, (Tokyo), Vol. 42, No. 2, (1978), pp. 365 to 369, discloses dough prepared with a mixture of alkali carbonates, namely 60 percent of $K_2CO_3$, 36 percent of $Na_2CO_3$ and 4 percent of $Na_2HPO_4.7H_2O$. In one instance a mixture of flour and the alkali carbonate mixture was used without sodium chloride. The dough was incubated at 40° C. for several hours, its pH was neutralized (pH 5.8) with hydrochloric acid.

U.S. Pat. No. 1,706,760 (White) discloses a process of treating grain particles by mixing carbonate of potash with the grain particles in the presence of heat.

U.S. Pat. No. 1,952,947 (Schott) discloses several baking powders, broadly, potassium compounds or salts or alkaline character, such as, potassium carbonate, potassium bicarbonate and/or potassium percarbonate, in conjunction with an acid compound and with special separating means (for example, substances of an inorganic or organic nature which absorb water of humidity). The latter substance can be fine starch powder, fine wheat flour or kieselguhr, for example.

U.S. Pat. No. 4,388,336 (Yong et al.) discloses an improved dough formulation containing a mixture of flour, water and shortening and at least one leavener including an organic acid leavener incorporated into the mixture. There is also present at least one of a calcium divalent or trivalent compound and aluminum divalent or trivalent compound in an amount effective to reduce gumminess of less than about 1 percent by weight of dough. At least one compound can include calcium carbonate in an amount of less than about 1 percent by weight of dough. The leavener can include chemical leaveners which include an acid and a base in which the reaction produces $CO_2$. Soda and bicarbonate of soda are disclosed.

U.S. Pat. No. 4,216,237 (Smith) discloses a dry, potassium-supplement composition including from 10 to 50 percent by weight of potassium chloride and a balance of from 25 to 50 percent by weight of the balance of a water-soluble carbohydrate, foodstuff ingredient which is sugar, a nonhydroscopic starch hydrolysate and a mixture thereof. From 50 to 75 percent by weight of the balance is an organic, potassium-containing foodstuff ingredient, at least half of which is milk solids, cocoa, powdered tomato or ground nuts. Sodium bicarbonate or potassium bicarbonate can also be present.

U.S. Pat. No. 4,044,155 (Hoseny et al.) discloses a nonfat dry milk substitute for incorporation into yeast-leavened doughs. The substituent includes deproteinized whey, a quantity of a substance providing from about 1 to 10 percent by weight of ammonium ion in the substitute, and from about 20 to 60 percent by weight of a protein supplement. The substitute can contain sufficient basic material to give the latter a pH of from about 3 to 7. The basic material can be the oxides, hydroxides, carbonates and bicarbonates of sodium, potassium, calcium and magnesium.

U.S. Pat. No. 3,632,355 (Hopkinton et al.) discloses a method of controlling the leavening of a bakery mix of the type employing an edible bicarbonate as the source of carbon dioxide gas for leavening purposes at sea level and various elevations above sea level. Substantially all of the edible bicarbonate is packaged in a first package, and the remaining ingredients of the bakery mix are packaged in a second package. The first package has a plurality of indicia which indicates an elevation above sea level to correspond with the amount of carbon dioxide obtainable from the edible bicarbonate in the portion of edible bicarbonate in the first package above each of the indicia which is required for optimum leavening of the remaining ingredients of the bakery mix at the elevation above sea level. The edible bicarbonate in the first package is separated along a plane running through the package parallel to a selected indicia indicating the approximate elevation at which the bakery mix is to be used. The portion of the edible bicarbonate in the first package below the plane is described with the remaining ingredients of the bakery mix in the dry state to produce a complete dry bakery mix. Aqueous fluid is mixed with complete dry bakery mix in a quantity sufficient to produce a baking dough. The baking dough is baked sufficiently to transform the baking dough into a bakery product. The component of the complete bakery mix, which is isolated from other components of the bakery mix, may be other potential gas-liberating materials, such as other edible carbonates or bicarbonates, e.g., ammonium bicarbonate.

U.S. Pat. No 3,505.082 (Miller) discloses a sodium free dietary-substitute composition for table salt. It contains 0.01 to 0.25 part of fumaric acid per part of potassium chloride. The composition is characterized by relative freedom from bitter after-taste, corrosiveness, hygroscopicity and deliquescence.

U.S. Pat. No. 3,490,916 (Henika) discloses a process for preparing yeast stable brews capable of being held for substantial periods of time and subsequently used in the leavening of doughs. Essential brew ingredients including water, yeast, yeast foods, sugar and salt are mixed with a stabilizing agent, e.g., cereal and soy flours, whey, calcium carbonate, dry nonfat milk, and mixtures thereof. The mixed brew contains sugar in an amount just sufficient to initiate yeast fermentation reactions to produce gas at a desired uniform relatively-high rate. The stabilized brew is held at a temperature within the range from about 75° to 95° F. for a period of time not in excess of about 25 to 45 minutes to achieve the desired gassing rate. The stabilizing agent is effective to control the pH of the brew to within a range from 4.0 to 4.8 without interfering in the gas producing activity of the yeast in the brew. The brew is cooled to a temperature below about 60° F. to effectively inhibit the gas producing activity of the yeast cells and to temporarily suppress yeast fermentation reactions. The brew is then held at a temperature below about 60° F.

U.S. Pat. No. 3,108,878 (Higashiuchi et al.) discloses a method for producing yeast-leavened baked goods of improved flavor. Disposed in water is: an amount of particulate, active lipoxidase-bearing edible material equal to 0.05 to 5.0 percent of the weight of the flour to be used in the dough and an amount of an edible enzyme-peroxidizable fat equal to 0.1 to 6.0 percent of the flour weight. The lipoxidase-bearing material has an active lipoxidase content equal to at least 10 percent of the active lipoxidase content of unprocessed soybean flour. The resulting aqueous composition is agitated, while maintaining the same at a temperature of 40 to 110° F. and a pH of at least 4.0, but not materially exceeding 8.5, thereby effecting peroxidation of the fat. The aqueous composition is then combined with flour and other dough-forming ingredients. The resulting mixture is worked to form a developed dough, and the dough is baked A calcium carbonate buffer can be used.

U.S. Pat. No. 3,052,549 (Kichline et al.) discloses a chemically-leavened baking composition suitable for prolonged storage at temperatures below about 30° F. The composition includes flour, water, shortening, a water-ionizable material containing calcium as one of its ions, a baking carbonate, an alkali metal acid pyrophosphate, and a water-soluble alkali metal polyphosphate having a chain length greater than about 8. The baking carbonate can be sodium bicarbonate or potassium carbonate.

U.S. Pat. No. 2,984,543 (Smith et al.) discloses a process for producing a stabilized free-flowing particle from carbonate product. The process involves intimately containing about 0.005 to about 0.2 weight percent based on the carbonate of guar gum. The resulting product is dried and reduced to finely-divided form. The reduced formed product is classified whereby a dry solid particulate product of the gum impregnated carbonate in the mesh size range of about 30 to 150 results. The product is used in the formulation of effervescing compositions.

U.S. Pat. No. 2,970,915 (Evanston) discloses a method for preparing bread combining flour, water, other dough-forming ingredients, and a small, but effective proportion of a bread improver composition comprising finely-divided particulate material, e.g., calcium carbonate, and an edible, normally solid, water-emulsifiable protective covering material. The latter can be lecithin, monoglycerides having an iodine value not exceeding 50, mixed mono- and diglycerides having an iodine value not exceeding 50, and the tartaric acid esters of mono- and diglycerides having an iodine value not exceeding 50.

U.S. Pat. No. 2,824,008 (Perri et al.) discloses an edible composition containing by weight, about 45 to 55 parts of potassium chloride, 30 to 40 parts of dipotassium succinate, and 10 to 20 parts of dipotassium fumarate.

U.S. Pat. No. 2,810,650 (Joslin) discloses a dough characterized by low temperature stability. The dough including, as a leavening component, dicalcium phosphate dihydrate in combination with sodium bicarbonate or potassium bicarbonate.

U.S. Pat. No. 2,601,112 (Freedman) discloses an edible composition composing a mixture of water-soluble saline tasting salts of potassium and ammonium in a major proportion and a salt of chlorine having an acid reaction in a minor proportion.

U.S. Pat. No. 2,394,791 (Lloyd et al.) discloses a batter for baking including an intimate mixture of neutral starch of pH not substantially below 6.8 lactide, and calcium carbonate, all in finely-divided condition. The calcium carbonate is present in the proportion of about 0.046 to 0.38 part for 100 parts dry weight of the batter mixture and 4 to 16 parts to 1 of the lactide. The neutral starch is substantially unreactive with the calcium carbonate. The excess of calcium carbonate over the amount chemically equivalent to the lactide serves to improve the quality of the batter. The starch can be neutralized with sodium carbonate, bicarbonate, or potassium bicarbonate.

U.S. Pat. No. 2,288,118 (Vaupel) discloses a process for the manufacture of soda crackers from a dough in which the leavening action is supplied by yeast and in which soda is added to overcome acid produced by the yeast. The dough sodium bicarbonate and an ammonium salt of a strong acid can be added in an amount not substantially more than 50 percent by weight of the bicarbonate and not substantially less than 25 percent by weight of the bicarbonate.

U.S. Pat. No. 2,137,027 (Pollak) discloses a method of preparing a dough conditioner increasing the fermentation tolerance of the dough. A mixture of neutralized organic acids phytins and ammonium chloride is prepared to form a first mixture. The organic acids are neutralized by means of nitrogen-containing yeast assimilable compounds. Thereafter the first mixture is mixed with materials containing diastatic enzymes to form a second mixture. The second mixture is heated in the presence of water to a point slightly below the damaging point of the amylolytic enzymes, whereby an interaction takes place between the first mixture and the diastatic enzymes. This increases the strength of the amylolytic enzymes without producing a corresponding rise in the activity of the proteoclastic enzymes. The neutralization can be done using ammonium carbonate in conjunction with calcium or magnesium carbonate.

U.S. Pat. No. 2,070,922 (Reichert et al.) discloses a cereal flour dough suitable for baking to produce an edible baked product, in which the dough has an alkaline reaction and a pH below 10. The dough contains a suitable quantity of hydrogen peroxide to act as a leavening agent without yeast or carbon dioxide evolving materials, and an alkali carbonate, such as, sodium carbonate.

U.S. Pat. No. 2,033,009 (Rosenthal) discloses a yeast fortified against acidic deterioration and adapted to be used in the making of leavened bread. The yeast mixture includes the ingredients: ammonium chloride, calcium sulfate, potassium bromate and flour. Calcium carbonate or magnesium carbonate is also present U.S. Pat. No. 2,032,442 (Schultz et al.) discloses a process for improving the crust color of baked goods. A dough batch is prepared and contacted during the baking period with an ammonium compound which liberates ammonia under the influence of heat. The ammonium compound can be ammonium carbonate.

U.S. Pat. No. 1,913,044 (Sasse) discloses a prepared flour which includes an ingredient adapted to be effective in the presence of atmospheric oxygen and water containing a carbonate in solution added to the flour to make dough. The ingredient includes a water soluble manganese salt and a water soluble citrate. The carbonate can be carbonates or bicarbonates of sodium or potassium.

U.S. Pat. No. 1,856,938 (Wiig) discloses a process of leavening, which includes incorporating at a leavening agent, into a mass to be leavened, a ketone dicarboxylic acid which decomposes with heat, and an alkaline substance capable of aiding decomposition of the agent. The mass is heated to bring about the decomposition. The alkaline substance can be sodium bicarbonate or one of the ammonium carbonates U.S. Pat. No. 1,803,588 (Blank et al.) discloses a new composition of matter which includes an oxidizing salt having a dough-maturing actin, an ingredient having an acid reaction, an ammonium salt adapted to supply nitrogen to the yeast and simultaneously to release acid components. There is an enzymatic substance adapted to aid in the conditioning of the dough to be used with yeast and a neutralizing agent in making short leavened products.

U.S. Pat. No. 1,633,872 (Rippey) discloses a process of making crackers by mixing flour, water and melted coconut oil and adding to this yeast, salt and sugar, and causing this mixture to raise for a period of four to five hours. Ammonium bicarbonate dissolved in cold water, together with sufficient flour to make a dough of the proper consistency is added. Mixing follows. The dough is caused to raise for a period of from one to two hours and rolled out. The dough is baked for about seven minutes.

U.S. Pat. No. 1,450,865 (Pelc) discloses a water soluble product composed of a hard, dry, porous mass which is stable in the absence of moisture. The mass is an active principle and a vehicle composed of effervescing salts which have reacted together to product a limited amount of carbon dioxide but which are capable of further reaction to produce additional carbonate dioxide. The product is made by mixing the active principle with the vehicle comprising powdered effervescing salts, causing the effervescing salts to react to evolve a limited amount of carbon dioxide and stopping the reaction before it is complete.

U.S. Pat. No. 1,425,628 (Grelck) discloses an improved flour comprising a milk product containing lactic acid and having the casein content in minute, precipitated discontinuous nonadherent particles, nonglutenous flour to absorb the excess flour of the milk product. The flour also contains water-insoluble gluten to an alkaline carbonate adapted to combine with the lactic acid of the milk product with the evolution of carbon dioxide. The alkaline carbonate can then be bicarbonate of soda.

U.S. Pat. No. 673,057 (Kochs) discloses a baking powder which is a mixture of monocalcium phosphate and the insoluble calcium phosphate having the formula $Ca_2H_2P_2O_8$.

U.S. Pat. No. 422,464 (Thatcher) discloses a baking powder which contains cream of tartar, an alkaline bicarbonate and sugar of milk.

British Pat. No. 335,214 (Dapper) discloses a process for the treatment of flour or dough with a mixture of presulfates and bromates for the purpose of increasing the baking property. Incorporated with the mixture of the additional substances, or jointly with them and the flour or dough, is an acid-neutralizing constituent, for instance, magnesium carbonate and/or calcium carbonate.

U.S. Pat. No. 331,542 (Peters) discloses a baking powder which contains an acid phosphate of lime and a carbonate of lime or magnesia or strontia.

U.S. Pat. No. 331,541 (Peters) discloses a baking powder which contains a carbonate of lime or magnesia or strontia with an acid sulfate of soda or any other equivalent acid sulfate of an alkali.

U.S. Pat. No. 328,364 (Underwood) discloses a baking powder or cream of tartar substitute which contains an acid lactate combined with the carbonates or bicarbonates of the alkaline earths.

U.S. Pat. No 317,821 (McDonald) discloses a baking compound containing bisulfate of potash or of soda and carbonate, bicarbonate, or sesquicarbonate of potash or of soda in proportions specified.

U.S. Pat. No. 315,832 (Peters) discloses a baking powder which contains boracic acid and carbonate of magnesia.

U.S. Pat. No 315,830 (Peters) discloses a baking powder which contains a boracic anhydride and a carbonate of an alkali, such as, bicarbonate of soda. Carbonate of magnesia can also be added.

U.S. Pat. No. 235,615 (Avery et al.) discloses a baking powder or cream of tartar substitute which contains an acid lactate with an alkaline carbonate or bicarbonate, such as, carbonate of potash.

U.S. Pat. No. 174,890 (Arnois) discloses a baking powder compound which contains muriate of ammonia and its chemical equivalent of alkaline carbonates. It is incorporated into the dough of bread, cake, pastry, and similar articles.

U.S. Pat. No. 150,844 (Eastwick et al.) discloses a self-rising flour which contains a salt of aluminum with or without sodium chloride or sugar.

U.S. Pat. No. 96,994 (Stowell) discloses a baking powder which contains bitartrate of ammonia and an alkaline carbonate, such as, the bicarbonate of soda.

U.S. Pat. No. 14,722 (Horsford) discloses pulverulent phosphoric acid for neutralizing alkaline bases and producing carbonic acid which will form a mixture of the pulverulent acid with alkaline carbonates upon the addition of moisture and/or heat. See also U.S. Reissue Pat. No. 2,597 and U.S. Reissue Pat. No. 2,979 of Horsford.

U.S. Reissue Pat. No. 27,981 (Frank et al.) discloses a seasoning salt composition containing from about 20 to about 80 percent by weight of potassium chloride and from about 80 to about 20 percent by weight of sodium chloride.

U.S. Pat. No. 4,353,926 (Sugihara) discloses a method of rapid, controlled preparation of soda cracker dough. A liquid starter is prepared by a process comprising forming a slurry containing flour and water in the proportion of about 3 to 5 parts of water per part of flour. The slurry is inoculated with viable cells of Lactobacillus plantarum in an effective concentration. A liquid sponge is prepared by a process comprising mixing the liquid starter with flour, shortening, and yeast, and fermenting the liquid sponge. A portion of the so-prepared and so-fermented liquid sponge is mixed with flour to form a soda cracker dough. The amount of liquid starter which is mixed with flour is sufficient to reduce the fermentation tie of the sponge and the amount of liquid sponge mixed with flour to form a soda cracker dough and is sufficient to reduce the fermentation time of the dough such that the latter two steps are carried out in about eight hours or less.

British Pat. No. 1085/1883 (Flasschoen) adding iron and manganese carbonates to bread, chocolates or biscuits during manufacture to produce medicated foods Russian Pat. No. 257,399 discloses that the curing properties of dietetic bread or rolls are improved by introductory of a small amount of KCl and LiCl in a 2:1 ratio. KCl, like NACl, removes water from the organism and is especially recommended in the case of cardiac vascular ailments, as NaCl may be harmful. The taste of the products is the same as with NaCl.

Bohn, Ralph M., "Biscuit and Cracker Production", (1957) pages 92 to 98, discusses the production and compositions of soda crackers. Soda is incorporated during mixing of the ingredients.

Food Materials and Equipment, (March 1946), p. 18, states that calcium carbonate can be used in place of sodium bicarbonate as a leavening agent in the pastry industry.

Food Products Formulary, Vol. 4, "Fabricated Foods", (1982), pages 14 to 16, shows the use of ammonium bicarbonate or sodium bicarbonate in cracker formulations.

Johnson, Arnold H., et al., "Encyclopedia of Food Technology", (1974), pages 113 to 118 and 543 and 548, (Johnson et al.), discloses that potassium hydrogen tartrate, i.e., cream of tartar, is a fast-acting baking acid, whereby the leavening gas is liberated chiefly during the mixing of the batter. The oven spring, i.e., expansion in the oven, is derived mainly from expansion of the preformed bubbles in the batter. The bench tolerance of such type of leavener is not suited for commercial bakery operations where machines are involved and there may be delays between mixing the batter and baking. Another fast-acting acid is monocalcium phosphate monohydrate, which is a more efficient leavener on a weight basis than is cream of tartar and does not react quite so rapidly in the batter. Anhydrous monocalcium phosphate has improved bench tolerance in that a portion of it is slow to dissolve in the batter and consequently has more oven spring.

Matz, Samuel A., "Bakery Technology and Engineering", (1960), pages 259 to 261, (Matz), deals with the sponge-and-dough method of mixing.

Matz, Samuel A., "Cookie and Cracker Technology", (1968), pages 77 to 84, 98 to 105 and 137 to 149, (Matz), states that an acidic pH is mandary in U.S. Pat. No. 4,277,504 and that potassium bicarbonate is very hygroscopic and tends to impart a bitter flavor in the foods in which it is used.

Pomeranz, Yeshahjahu, et al., "Basic Science And Technology", (1971), pages 41 and 42, (Pomeranz), discusses straight and sponge fermentation.

Pyler, E.J., "Baking Science And Technology", Vol. II, (1952), pages 389 and 391, (Pyler), discusses the sponge dough method.

Sultan, William J., "Practical Baking", (1965), pages 348 and 349 (Sultan), discusses making sponge cake and the inclusion of baking soda.

In the production of sponge goods, such as soda crackers, sodium bicarbonate serves a dual function of: (1) neutralizing the acids produced by fermentation in production of the sponge and, (2) leavening the sponge-good dough prior to and during baking. The yeast-leavened sponge contains a considerable amount of acid which is developed by the yeast and by bacteria during fermentation. Sponge formation is followed by production of the sponge-good dough. The acid in the sponge is neutralized by adding sodium bicarbonate when the dough stage is mixed. The production of soda crackers by such method is disclosed in U.S. Pat. No. 1,803,588, U.S. Pat. No. 2,288,118, Johnson et al., Encyclopedia of Food Technology, The AVI Publishing Company, Inc., Westport, Connecticut, Vol. 2, (1974), pages 113 and 114, Matz, Samuel, Cereal Technology, The AVI Publishing Company, Inc., Westport, Connecticut, (1970), pages 80 and 82, and in Matz, Samuel, Cookie and Cracker Technology, The AVI Publishing Company, Inc., Westport, Connecticut, (1968), pages 137 to 142. A soda cracker produced by this method typically contains about 194 mg total sodium per 14.2 gm serving. About 20 to 25 percent of this total sodium is due to the use of sodium bicarbonate. Medically, it is considered essential that persons suffering from vascular diseases, coronary diseases, the liver diseases, be restricted to a low sodium diet.

Many compositions have been developed as a replacement for common table salt, or sodium chloride, for use in low sodium diets. Salt substitute compositions are disclosed in U.S. Reissue Pat. No. 27,981, U.S. Pat. No. 2,601,112, U.S. Pat. No. 2,824,008 and U.S. Pat. No. 3,505,082. In the compositions of these patents, potassium chloride is used as a replacement for sodium chloride. Other ingredients are added to mask the bitter taste of the potassium ion and to minimize caking and dusting. The beneficial effect of including potassium in the diet is taught in U.S. Pat. No. 4,216,237 in the Russian Pat. No. 257,399. In U.S. Pat. No. 4,216,237 the bitter taste of the potassium ion is masked with a water-soluble, carbohydrate foodstuff ingredient. Potassium chloride, it is disclosed, is prone to ulcerate the intestinal tract, in addition to being unpalatable. Substantially equal portion of bicarbonate, citrate and diphosphate are used to achieve a better balance of anions more closely related to natural potassium sources. Approximately ¼ and ½ of the potassium salt ingredient is comprised by the chloride. In Russian Pat. No. 257,399, potassium chloride is used in a two-to-one ratio with lithium chloride to improve the curing properties of dietetic bread or rolls. The taste of the products, it is disclosed, is the same as with sodium chloride and the harmful effects of sodium chloride are avoided. While replacement of sodium chloride with potassium chloride can be beneficial to the health, as indicated in these patents, it would not serve the function of neutralizing the acids produced in forming a sponge, and it would not leaven the sponge-good dough. Additionally, sodium chloride contributes flavor to a cracker or sweet good. In producing a low sodium baked good, it would be desirable to eliminate other sources of sodium to enable retention of some sodium chloride for its flavoring characteristics.

While sodium bicarbonate is the most widely used chemical leavening agent, many other compositions for producing carbon dioxide gas in foods without the use of sodium bicarbonate are known. Baking powder compositions which contain ammonium carbonate or ammonium bicarbonate are disclosed in U.S. Pat. No. 150,844, U.S. Pat. No. 174,890, U.S. Pat. No. 235,615, and U.S. Pat. No. 1,865,938. The carbonate of barium is considered to be poisonous in U.S. Pat. No. 331,541 and U.S. Pat. No. 331,542. The carbonates of calcium, magnesium and strontium are used in the baking powder compositions of the latter two patents. The carbonates of calcium are also utilized in the baking powders of U.S. Pat. No. 150,844 and U.S. Pat. No. 328,364. The carbonates of magnesium are present in the baking powders of U.S Pat. No. 315,830, U.S. Pat. No. 315,831, U.S. Pat. No. 315,832 and U.S. Pat. No. 328,364. The carbonate or bicarbonate of potassium is present in the baking powder compositions of U.S. Reissue Pat. No. 2,597, U.S. Reissue Pat. No. 2,979, U.S Pat. No. 14,722, U.S. Pat. No. 96,996, U.S. Pat. No. 150,844, U.S. Pat. No. 174,890, U.S. Pat. No. 235,615 and U.S. Pat. No. 673,057. According to U.S. Pat. No. 235,615, the bicarbonate is preferred over the carbonate for raising bread because less lactate is required to react with the bicarbonate. In U.S. Pat. No., 422,464, it is taught that ammonium carbonate is used to prevent a baking soda comprising cream of tartar and sodium bicarbonate from becoming hard. However, according to U.S. Pat. No. 422,464, the carbonate of ammonium is considered to be objectionable as a food.

Effervescing salt compositions which utilize carbonates for producing carbon dioxide are disclosed in U.S. Pat. No. 1,450,865 and U.S Pat. No. 2,984,543. The carbonates or bicarbonates of sodium, potassium, ammonium, calcium or magnesium may be used in the compositions of U.S. Pat. No. 1,450,865. In U.S. Pat. No. 2,984,543 the effervescing salt may contain potassium or lithium bicarbonates or calcium, magnesium, or organic carbonates. However, in these effervescing salt compositions and in the baking powder compositions, an acid is included for reaction with the bicarbonate or carbonate for producing the carbon dioxide. These compositions would be unsuitable for use in producing a sponge-good dough because they would not serve the dual function of leavening the sponge-good dough and neutralizing the acids which are produced during formation of the sponge.

The addition of an alkaline carbonate as a neutralizer and as a leavening agent for a "prepared flour" is taught in U.S. Pat. No. 1,428,628. Lactic acid which is present in sour milk or butter milk of the prepared flour is neutralized by the alkaline carbonate. Bicarbonate of soda, however, is the only carbonate disclosed in the patent.

The use of carbonates, other than sodium bicarbonate in the production of baked goods is disclosed in British Pat. No. 1,085 of 1883, British Pat. No. 335,214, U.S. Pat. No., 2,970,915 and as early as 1796 in Simmons, Amelia, American Cookery, reprint by Martin Rywell, Buck Hill Associates, Johnsburg, NY 12843, (1966), pages 30 and 32. The addition of iron and manganese carbonates to bread and biscuits for medicinal purposes is disclosed in British Pat. No. 1,085/1883. Magnesium and/or calcium carbonates are taught as acid-neutralizing constituents in British Pat. No. 335,214 for dough or flour compositions which contain persulphates and bromates. Calcium carbonate is disclosed as a bread improver in U.S. Pat. No. 2,970,915. In Simmons, Amelia, ibid., recipes for honey cake and cookies include pearl ash, an impure potassium carbonate product obtained by partial purification of potash from wood ashes. Replacement of sodium bicarbonate with potassium carbonate to achieve sodium reduction in the final baked product is not taught by any of these references.

The preparation of a health bread with potassium carbonate and ammonium carbonate as a leavening agent is taught in U.S. Pat. No. 2,228,729. The potassium carbonate, it is disclosed, results in a bread which is free of greenish color or hue and possess a fine whitish interior. The ammonium and potassium carbonates are added to a sponge which contains approximately 40 percent or more eggs. The large percentage of eggs, it is disclosed, creates a large expanding force upon heating thereby reducing the usual amount of chemical leavening agents needed for expansion. Although a sponge is produced, fermentation is not disclosed in the patent. Additionally, the degree of expansion needed in the production of the bread would be unacceptable in the production of crackers.

The use of alkaline carbonates, other than those of sodium, as a leavening agent or neutralizing agent in the production of baked goods, is also disclosed in U.S. Pat. No. 317,821, U.S. Pat. No. 1,913,044, U.S. Pat. No. 2,070,922, U.S. Pat. No. 2,394,791 and Food Materials and Equipment, (March 1946), page 18. Treating sponge to neutralize its acidity, to leaven it and to obtain a low-sodium cracker is not disclosed in these references. In U.S. Pat. No. 317,821, the acid or disulfate of potash with carbonates or bicarbonates or potash is used as a replacement for tartaric acid in the production of bread, cakes, biscuits, and the like. In U.S. Pat. No., 1,913,044, a bicarbonate or carbonate of either sodium or potassium is reacted with manganese succinate to promote oxidation of the coloring matter in a bread dough. Calcium carbonate is taught as a replacement for sodium bicarbonate in the pastry industry in the Food Materials & Equipment article. In U.S. Pat. No. 2,070,922, hydrogen peroxide is used as a leavening agent in the production of waffles, griddle cakes, crackers, and the like. Alkaline metal carbonates are used to stabilize the hydrogen peroxide and to make the formulation alkaline at a pH of about 8 to 10. Preneutralization of starch for various wafer or waffle batters with calcium carbonate is taught in U.S. Pat. No. 2,394,791. The calcium carbonate replaces a portion of the sodium bicarbonate, the sodium bicarbonate being retained to obtain sufficient leavening action.

Treatment of a fermented dough with a carbonate other than sodium is disclosed in U.S. Pat. No. 2,032,442. In the process of such patent, a heat-decomposable ammonium compound, such as a carbonate of ammonium, is applied to the surface of a fermented dough. Subsequent baking releases ammonia which brown the surface of the bread, rolls, and the like products. Mixing of the ammonium carbonate with the fermented dough to distribute it substantially uniformly throughout the dough to achieve neutralization of acids produced during fermentation is not disclosed.

The use of alkaline carbonates, other than sodium bicarbonate, in fermented doughs for the production of various baked goods, is disclosed in U.S. Pat. No. 2,033,099, U.S. Pat. No. 2,137,027, U.S. Pat. No. 3,108,878 and U.S. Pat. No. 4,044,155. In the processes of these patents the alkaline carbonate is added with the yeast and is present during fermentation. Breads, rolls, buns, and the like are produced from these yeast leavened doughs. The production of soda crackers is not disclosed. In U.S. Pat. No. 2,033,009, an alkaline salt is added to the yeast food to keep it alkaline until it reaches the fermentation stage, whether in the dough or in the sponge. Calcium carbonate or magnesium carbonate are disclosed as the preferred alkaline salts because of their slow solubility. In U.S. Pat. No. 2,137,027, a yeast sponge is buffered with ammonium carbonate or calcium or magnesium carbonates. In U.S Pat. No. 3,108,878, a calcium carbonate buffer is added with yeast to a soy flour dough composition In U.S. Pat. No. 4,044,155, a non-fat dry milk substance for incorporation into yeast-leavened doughs, is prepared by mixing deproteinized whey, an ammonium compound such as ammonium carbonate or bicarbonate, and a protein supplement. A basic material, such as a carbonate or bicarbonate, and a protein supplement. A basic material, such as a carbonate or bicarbonate or sodium, potassium, calcium, or magnesium, is optionally added to control the pH of the substitute and to at least partially neutralize the deproteinized whey.

Calcium carbonate is taught as a buffering agent for a liquid yeast brew in U.S. Pat. No. 3,490,916. The brew may be used to form a yeast leavened dough, which may be a cracker or soda cracker composition. The use of calcium carbonate to neutralize the acids present in a sponge and to leaven the fermented dough is not disclosed. Furthermore, calcium carbonate is not sufficiently soluble in water to uniformly neutralize the acids in a sponge or to leaven a sponge dough substantially uniformly.

U.S. Pat. No. 1,633,872 discloses ammonium bicarbonate as a substitute for baking soda in the production of an unsalted cracker. According to U.S. Pat. No. 1,633,872 salt is added to the surface of a cracker to mask the objectionable taste resulting from the breakdown of the fat used as shortening. The rancidity is eliminated by the use of coconut oil, thereby eliminating the need for a salt topping. The use of ammonium bicarbonate instead of sodium bicarbonate as the means of raising the dough, it is disclosed, eliminates the soda flavor and improves the color of the cracker. A relatively rapid fermentation time of four to five hours is used before the ammonium bicarbonate is added to the sponge dough. Adding sufficient ammonium bicarbonate to neutralize acids produced during the fermentation is not disclosed. According to U.S. Pat. No. 1,633,872, if too large a proportion of ammonium bicarbonate is used, a yellow objectionable color develops in the cracker.

In using ammonium bicarbonate alone as a replacement for sodium bicarbonate, neutralization of acids produced during fermentation becomes a problem. As disclosed in U.S. Pat. No. 1,633,872, the ammonium bicarbonate is entirely volatilized in the baking operation. The release of both ammonia and carbon dioxide makes pH control of the final product difficult. Furthermore, it has been found that replacement of sodium bicarbonate with ammonium bicarbonate in the production of a soda cracker, does not result in a uniform laminar cell structure. Large cells and tight areas are obtained with ammonium bicarbonate. The cracker is too tender and has both flat and raised or bubbled portions. Accordingly, ammonium bicarbonate alone is not a suitable replacement for sodium bicarbonate in the production of an acceptable low sodium soda cracker.

Potassium bicarbonate has been used as a component in leavening mixtures for baked products intended to be consumed in sodium-free diets. However, as disclosed by *Matz, Samuel, Cookie and Cracker Technology*, (1968), page 77, potassium bicarbonate is very hygroscopic and tends to impart a bitter flavor to the foods in which it is used. Crackers are baked to a low moisture content and their crispness gives a snap or crunch upon eating. The presence of a highly hygroscopic material in a cracker would tend to be deleterious to the achievement of these sensory properties. Additionally, potassium bicarbonate is very expensive. Matz teaches away from the use of carbonates because their very high alkalinity, compared to the alkalinity of sodium bicarbonate, tends to result in localized areas of very high alkalinity which is formed as the granules dissolve in the dough. These localized areas, it is disclosed, result in reactions which lead to undesirably colored and flavored products. In producing a laminated product, these localized areas generally appear as dark streaks in the baked product.

BROAD DESCRIPTION OF THE INVENTION

An object of the invention is to provide a cake mix for making a low sodium cake, which has good volume, fine texture, good flavor, pleasant mouth feel and uniform color. Another object of the invention is to provide a process for preparing such a low sodium cake from such a cake mix. A further object of the invention is to provide a cake mix and a process which provide a low sodium cake, which has a low pH between about 7 and about 7.2. Other objects and advantages of the invention are set out herein or are obvious herefrom to one ordinarily skilled in the art.

The objects and advantages of the invention are achieved by the cake mix and process of the invention.

The invention involves a process for preparing low-sodium cake products without using sodium bicarbonate or other sodium-containing leavening agent. Low sodium cakes can be prepared from the invention cake mix precursor. Reduction of the sodium chloride level and the sodium bicarbonate level can achieve a sodium content of, for example: (a) less than or equal to 42 mg., preferably less than or equal to 35 mg., per 14.2 gm serving for "very low sodium products", or (b) less than or equal to 6 mg., preferably less than or equal to 5 mg., per 14.2 gm serving for "no-sodium products". The nonshortening portion of the cake mix precursor is sufficiently mixed to achieve a thorough mixing thereof. The nonshortening portion is admixed with the leavening portion of the cake mix precursor. In a first embodiment, the leavening portion contains calcium monophosphate, which is an acidic leavening agent, and potassium carbonate or potassium bicarbonate, each of which is a basic leavening agent. The potassium carbonate acts as a leavening agent and a neutralizing agent. The two leavening agents are used in such a balance proportion that the pH of any resultant cake product therefrom has a pH of 6.8 to 7.5. Preferably encapsulated potassium carbonate or encapsulated potassium bicarbonate is used. Such mixture is admixed with the shortening portion of the cake mix precursor and the other cake ingredients including eggs and milk to prepare a cake batter. The cake batter is then baked for a sufficient time and at a sufficient temperature to provide the low sodium cake.

In a second embodiment, the leavening portion contains an edible acidic component capable of reacting with the potassium carbonate to liberate carbon dioxide, such as, monocalcium phosphate, and potassium carbonate, which is a basic leavening agent. The potassium carbonate acts as a leavening agent and a neutralizing agent. The two leavening agents are used in such a balanced proportion that the pH of any resultant cake product therefrom has a pH of about 6.8 to about 7.5, preferably 7.0 to 7.2. Preferably encapsulated potassium carbonate is used as the basic leavening agent. Calcium monophosphate is the preferred acidic leavening agent.

All or most of the sodium bicarbonate used in conventional formulations for baked goods is replaced, in the invention, by potassium carbonate.

By eliminating all or a substantial portion of the sodium bicarbonate or other sodium-containing leavening agents, some of the sodium chloride can be retained if desired while still achieving a significantly lower sodium content. Reduction of the sodium chloride level and the sodium bicarbonate level allows achievement of a sodium content, for example, of less than or equal to 35 mg per cake serving.

In the first embodiment, sufficient amounts of potassium carbonate and calcium monophosphate are used to effect leavening of the cake dough and to achieve pH in the final cake product of about 6.8 to about 7.5 and preferably of 7.0 to 7.2.

In the second embodiment, some of the potassium carbonate can be replaced by potassium bicarbonate, preferably no more than 50 weight percent The potassium bicarbonate is preferably used in encapsulated form.

The invention relates to the production of low sodium cakes, doughnuts or muffins using a cake mix which does not use any fermentation agent; that is, it only has chemical leavening agents. In a conventional cake mix there are three primary sources of sodium, namely, (1) the sodium chloride used to provide flavor or bite, (2) a basic leavening agent, such as, sodium bicarbonate, which aids producing good texture and volume and (3) an acid leavening agent, such as, sodium aluminum phosphate. The purpose of the acid is to react with the carbonate to produce carbon dioxide which provides the cake with the proper volume and texture. It is also necessary that there be a proper balance between the acidic and basic components so that, after chemical reaction takes place therebetween, the cake is not flat or distorted in taste. If the basic component prevails, or is not sour, in the event that there is a predominance of the acidic component, such taste problems can occur. Generally, a proper balance between the acidic and basic components is achieved if the pH of the final cake is substantially neutral, that is, in the range of 7 to 7.2.

The essence of the invention is to achieve proper balance between the acidic and basic components of the cake mix while at the same time significantly reducing the sodium content so that there will be less than or equal to 35 mg of Na per serving.

As used herein, unless otherwise indicated, a serving for cakes is 55.4 gm, which is slightly less than 2 ounces.

The core of the invention is to substitute potassium carbonate for sodium bicarbonate as the basic leavening agent and to preferably use monocalcium phosphate in place of sodium acid pyrophosphate as the acidic leavening agent. Monocalcium phosphate or monobasic calcium phosphate is represented by the formulation $CaH_4(PO_4)_2$. A proper balance of potassium carbonate and monocalcium phosphate is maintained to achieve the desired pH of 7 to 7.2. A reduced amount of sodium chloride can be added to improve the flavor. Potassium carbonate is preferably used in a granulated form to achieve better distribution. Since the mix is in a dry powder form, however, it is freely flowable and there is less likelihood of the development of a hot spot problem or dark streaks as is the case with soda crackers or cookies. In the latter case, potassium carbonate is added to a sponge and the requirements for distribution of the potassium carbonate are more stringent. It has been found that the final cake products, resulting from an adoption of the above formulation, have good texture, are not bitter to the taste, have pleasant mouth feel and have a substantially uniform laminar cell structure.

In addition to the potassium carbonate and monocalcium phosphate, the baking powder portion of the invention cake mix can contain an inert diluent which does not interfere with the action or stability of its active leavening agents.

The invention also involves a low sodium cake mix comprising a shortening portion, a nonshortening portion and a leavening portion. The invention cake mix has excellent shelf stability. The leavening portion contains calcium monophosphate, which is an acidic leavening agent, and potassium carbonate, which is a basic leavening agent. The two leavening agents are present in such a balanced proportion that the pH of any resultant cake product therefrom is in the range of 7 to 7.2. The invention cakes have substantially uniform texture and pH throughout, a substantially uniform surface color, pleasant mouth feel, good appearance, satisfactory volume, adequate moisture, nonbitter taste and a substantially uniform laminar cell structure despite a considerable reduction or elimination of the bicarbonate. The taste of the invention cakes is the same as with sodium chloride but the harmful effects of sodium chloride are avoided. In producing a low-sodium cake, it is sometimes desirable to eliminate other sources of sodium in order to enable retention of some sodium chloride for its flavoring characteristics. The baked invention cakes have a uniform brown color on their surfaces and are devoid of hot spots or dark streaks caused by localized area of carbonate leavening agents.

Conventional formulations can be used for the production of baked cake goods of the invention except that the sodium bicarbonate is replaced with potassium carbonate. Replacing all of the sodium bicarbonate with potassium carbonate allows for substantially all of the sodium content to be obtained from the sodium chloride. The sodium chloride contributes to flavor enhancement and the elimination of a bland taste to a much greater extent than does sodium bicarbonate, in sponge goods as well as in other baked goods. It has been found that due to the higher alkalinity of potassium carbonate, the amount of potassium carbonate which is needed to achieve a desired pH is approximately 80 to 90 percent by weight of the amount of sodium bicarbonate used in a conventional formulation.

As used herein, the term "cake mix", unless otherwise stated herein or otherwise obvious herefrom to one ordinarily skilled in the art, is used in its generic sense and can be used to make baked goods, such as, cakes, pancakes, waffles, muffins, cupcakes and doughnuts, which are prepared using only leavening agents. Examples of the type of cakes are pound cakes, sponge cakes, layer cakes, chiffon cakes and angel food cakes.

The percentages of the components of the leavening compositions of the invention are calculated on an anhydrous basisd, i.e., with the weights of all of the components calculated in their anhydrous forms, ignoring any water of crystallization which may be present. The components need not actually be used in their anhydrous forms.

DETAILED DESCRIPTION OF THE INVENTION

Under current Food and Drug Administration proposals, a "low sodium" baked good, which includes sponge goods, unfermented type crackers, cookies and cakes, has a sodium content of less than or equal to 35 mg.of NA per serving. Also a "no sodium" baked good has a sodium content of less than or equal to 5 mg. of Na per serving. The weight of a "serving" depends upon the type of baked good; as used herein, a serving is 55.4 gm (about 2 oz.) for cakes. The invention provides a process for reducing the sodium content of bakes cakes to a "low sodium" or "no-sodium" level as defined above for baked cakes. The sodium content is based upon the final baked cake (i.e., the serving)

In the production of cakes from cake mixes, according to the process of the invention, conventional formulations can be used except for the substitution of potassium carbonate for sodium bicarbonate, and the substitution of monocalcium phosphate for sodium aluminum phosphate and the reduction of sodium chloride. A certain amount of sodium chloride is desirable since it contributes to flavor enhancement and to an improvement in the cell structure. Because of the higher alkalinity of potassium carbonate, only 80 to 90 percent by weight of the amount of sodium bicarbonate used in a conventional cake mix needs to be used to achieve the desired pH.

The dry cake mix comprises three components, namely, a nonshortening portion, a shortening portion and a baking powder portion. The nonshortening portion consists essentially of stable nonreactive ingredients, such as sugar, flour, salt, eggs and milk. The eggs and milk are not part, as such, of the formulation of the cake mix of the invention, but they are added in the processing of the cake to make the batter. The user has to supply his own eggs and milk. Any flour can be used, such as, wheat flour, rice flour, graham flour and mixtures thereof, but wheat flour is preferred The salt can be blended with the baking powder. The shortening portion consists essentially of at least one shortening ingredient such as lard, vegetable shortening or emulsified vegetable oil in a solid form. Preferably emulsified vegetable oils such as soybean are used. Based upon the total weight of the final cake dough, the final cake dough preferably includes 65 to 80 weight percent of flour, 0 to 5 weight percent of milk, 0 to 10 weight percent of sugar, 0 to 12 weight percent of salt, as sodium chloride, 0 to 5 weight percent of eggs, and 14 to 25 weight percent of shortening. No shortening is used if a sponge cake is to be made.

The cake mix of the invention can contain other ingredients which do not have a detrimental effect on the invention. The nonshortening portion of the invention cake mix can include dough improvers such as oxidizing agents which act to improve the handling characteristics of dough and the specific volume and texture (indirectly) of the finished cake products. The oxidizer can be, for example, potassium bromate, potassium iodate or calcium peroxide. The oxidizers exert their effect on the mechanical properties of the dough by causing the formation of additional cross-bonds between gluten molecules.

In the first embodiment, the monocalcium phosphate can be monocalcium phosphate monohydrate or anhydrous monocalcium phosphate. The neutralizing value of a leavening acid is defined as the parts by weight of sodium bicarbonate that can be neutralized, i.e., converted to $CO_2$ and salt, by 100 parts of the leavening acid. Monocalcium phosphate monohydrate has a neutralizing value of 80 and anhydrous monocalcium phosphate has a neutralizing value of 83 to 84.

In the first embodiment, based upon the total weight of the final cake dough, the final cake dough includes preferably about 0.15 to about 0.35 weight percent, most preferably 0.21 to 0.25 weight percent, of monocalcium phosphate, and preferably about 0.10 to about 0.25 weight percent, most preferably 0.13 to 0.15 weight percent, of potassium carbonate.

In the second embodiment, the convenient food grade acidic compound (leavening agent) for use in conjunction with the potassium carbonate is preferably calcium phosphate monobasic, most preferably in the form of its monohydrate. Other food grade acidic compounds, for example, fumaric acid, may also be used. It will be appreciated that these or similar food grade acidic compounds are normally included in conventional chemically-leavened doughs which use sodium bicarbonate as the leavening agent. Accordingly, when sodium bicarbonate is replaced with potassium carbonate in accordance with the present invention it may only be necessary to increase the quantity of food grade acidic compound already present in the dough. The amount of food grade acidic compound added (or the increase in the existing amount of acidic compound present in the dough) will of course vary with the amount of potassium carbonate used and the pH desired in the final product. The monocalcium phosphate used in this invention can be monocalcium phosphate monohydrate or anhydrous monocalcium phosphate.

In the second embodiment, based upon the total weight of the final cake dough, the final cake dough includes preferably about 0.15 to about 0.35 weight percent, most preferably 0.21 to 0.25 weight percent, of monocalcium phosphate, and preferably about 0.10 to about 0.25 weight percent, most preferably 0.13 to 0.15 weight percent, of potassium carbonate.

The baking powder portion of the invention cake mix can contain at least one inert diluent which does not interfere with the action or stability of the active leavening agents. An advantageous diluent is cornstarch, which stabilizes the mixed acid and base leavening agents of the invention by preventing interaction during storage and transportation. Such stabilizing action is aided by the use of specially dried low moisture starch. Flour can also be used as the inert diluent.

The baking powder portion consists of a proper balance of potassium carbonate (or potassium bicarbonate) and monocalcium phosphate. The proportions of potassium carbonate and monocalcium phosphate are chosen so as to liberate carbon dioxide in the presence of water and to insure neutralization of the acid by the potassium carbonate to produce a pH in the final product of 7 to 7.2. In the first embodiment, the potassium carbonate can be replaced by potassium bicarbonate; in the second embodiment, some of the potassium carbonate can be replaced by potassium bicarbonate. In addition to the above, it has been found desirable to add some ammonium bicarbonate and a slight amount of sodium bicarbonate to improve volume and texture. Encapsulated $K_2CO_3$ is expensive; obtained 37 percent more volume when potassium bicarbonate was used. $K_2CO_3$ is more soluble in cold water than potassium bicarbonate and is more reactive. In using $K_2CO_3$ alone, the volumes of the cakes were found to be 8 to 10 percent below those that contain sodium bicarbonate. To improve the volume, emulsifiers, gums, and fats were experimented with. However, not only did such agents fail to achieve improved volume, they also produced other undesirable effects such as thickening of the texture, a tunneling effect, excessive moistness and a heavy mouth feel. Ammonium bicarbonate improved the volume so that the volume of the cake products were 3 percent less than those of the control and if a slight amount of sodium bicarbonate was added, the volume was equal to that of the cakes using sodium bicarbonate. But the ammonium bicarbonate resulted in a cake having browned areas and an unusual, wild texture. The use of granulated $K_2CO_3$ was found to give excellent distribution thereof in the dough. Typical amounts of the baking powder ingredients based on the weight of the flour were about 0.1 percent of salt, 0.115 percent of sodium bicarbonate, about 1 percent of monocalcium phosphate and 0.17 percent of ammonium bicarbonate. A combination of sodium acid pyrophosphate with the monocalcium phosphate was also found to be satisfactory, although the use of monocalcium phosphate by itself is preferred. It has been found that no more than 0.23 percent of sodium acid pyrophosphate should preferably be used, the reason being pH control. In the first embodiment, acidic leavening agents, such as, sodium acid pyrophosphate, tartaric acid, sodium aluminum phosphate, malic acid, potassium acid tartrate and citric acid, can be used in place of all or part of the calcium monophosphate (but the results are not as good as when calcium monophosphate is used by itself). In preparing the premix, all of the baking powder ingredients including salt were blended together. These were kept separate from the flour, sugar, powdered shortening and shortening. Inclusion of a small amount of sodium chloride is sometimes desirable since it contributes to flavor enhancement and improvement in the cell structure.

If potassium from the potassium carbonate causes a bitter taste in the dough, such bitter taste is preferably masked by the addition of an effective amount of lemon or lime juice to the dough formulation. Sugar tends to mask the bitter taste of potassium bicarbonate.

The cake dough can be prepared using any conventional process, wherein any order of mixing can be used. But advantages are achieved using a special mixing procedure.

A one-step mixing procedure for producing the cake is preferred. Wheat flour and sugar are poured into a small mixing bowl and mixed. To this mixture is added the premixed blend of baking powder ingredients known as the spice blend with another mixing followed by the powdered shortening and then the ingredients are mixed again. The solid shortening in small pieces is added and mixed. After all of the elements of the mix have been added, milk and eggs are added. A final mixing is undertaken, following which the mixed contents are poured into a loaf pan and baked in a reel oven.

Following the baking, the cake is removed from the oven, cooled to room temperature and cake measurements, pH, moisture and taste evaluation can be performed. These results can be evaluated against a control cake which contain a conventional formulation.

The ultimate amount of salt added is governed by the desired serving limitation on sodium, e.g., 35 mg or less of sodium per serving. The amount of potassium carbonate is governed by the amount of acid present in the monocalcium phosphate. A range of about 0.20 to about 0.24 weight percent, dry mix basis, has been found generally suitable to obtain the desired pH range of 7 to 7.2. The precise amount needed to obtain a desired final pH can be determined by the same techniques used to determine the amount of sodium bicarbonate addition. Because of the higher alkalinity of potassium carbonate only 80 to 90 percent by weight of the amount of sodium bicarbonate used in a conventional cake mix need to be used to achieve the desired pH.

Since $K_2CO_3$ is more alkaline than sodium bicarbonate, the amount of $K_2CO_3$ that needs to be used is only about 80 to 90 percent of the amount of sodium bicarbonate which would have to be used. Granulated potassium carbonate having a sieve analysis as follows is preferably used:

| Mesh Size | Percent Weight Retention |
|---|---|
| 100 | 2 |
| 200 | 15 to 45 |
| 325 | 50 |

Since potassium carbonate is usually blended in a dry state with all of the other spice blend ingredients and the spice blend premix is then admixed into a mix of flour and sugar, effective distribution of the potassium carbonate is assured so that no localized areas of alkalinity are produced in the cake with its consequential dark streaks.

Any suitable method can be used to form the dough into pieces.

Baking is carried out for conventional times and temperatures. The process of the invention achieves an oven spring which is the sum of all the leavening that occurs in the oven.

The invention provides a process for the production of a cake such as sponge cake or a white layer cake from a cake mix that has good appearance, satisfactory volume, adequate moisture, fine texture, pleasant mouth feel, non-bitter taste and a substantially uniform laminar cell structure despite a considerable reduction in the amount of or elimination of the sodium bicarbonate. By the absence or reduction of the sodium bicarbonate, considerable sodium reduction can be achieved. However, some sodium chloride can be added to the cake dough for flavoring characteristics. The baked products produced have a uniform brown color on their surfaces, are of substantially uniform pH throughout, and are devoid of hot spots or dark streaks caused by localized concentrations of the potassium carbonate leavening agent.

The following examples illustrate the various means of practicing the invention. All percentages, ratios, parts, and proportions are by weight and all temperatures are in °F unless otherwise indicated. As used in the examples, unless otherwise indicated, a serving for cakes is 55.4 grams, which is slightly less than 2 ounces.

Example 1

Low Sodium Pound Cake

A control pound cake formulation (termed "control cake") and a low sodium cake formulation according to the invention (termed "invention cake A") were prepared having the following constituents:

| Formula | grams per Control Cake | Percent of total dries | grams per Cake A | Control % of flour |
|---|---|---|---|---|
| Flour | 171.46 | (37.8) | 171.46 | |
| Sugar fine-granulated | 180.49 | (39.79) | 60.15 | 105.26 |
| Shortening | 87.49 | (19.23) | 83.23 | 50.88 |
| Spice Blend | | | | |
| Salt | 4.54 | (1.00) | — | 2.65 |
| Wheat Starch, gelatinized | 4.54 | (1.00) | 4.54 | 2.65 |
| Vanilla Flavorant | 2.63 | (0.58) | 2.63 | 1.53 |
| Baking Soda, granulated | 1.13 | (0.25) | — | 0.66 |
| Sodium Acid Pyrophosphate | 1.04 | (0.23) | — | 0.61 |
| Coated Monocalcium Phosphate | 0.54 | (0.12) | 0.54 | 0.31 |
| Potassium Carbonate (87% of soda), powder form | — | — | 0.98 | — |
| Monocalcium Phosphate, anhydrous | — | — | 1.04 | — |

Pound Cake Low Sodium (using 2 mixers side by side during control and sample simulated)

Using two mixers side by side for the simultaneous preparation of the control cake and invention cake A, the control cake and invention cake A were prepared using the following one-step mixing procedure:

One-Step Mixing Procedure (1) The eggs and milk were removed from the refrigerator and allowed to set until reaching room temperature. All of the ingredients should be at room temperature.

(2) The reel oven was preheated to 325° F.

(3) The bottom only of a loaf pan (9⅜ in. × 5½ in. × 2¾ in.) was greased and lined.

(4) The eggs were broke into a small bowl and beat slightly.

(5) The flour and sugar were weighed into a small mixing bowl and then mixed in on the first speed of the mixer for three minutes.

(6) The premixed spice blend was sieved on and mixed in on the first speed of the mixer for three minutes (7) The premixed powdered shortening was sieved on and mixed in on the first speed of the mixer for five minutes.

(8) The shortening at room temperature was added, cut well with knife into small pieces, and mixed in on the third speed of the mixer for three minutes.

(9) Using a graduate, 177 cc of milk at room temperature of 94 cc of eggs at room temperature were poured in and mixed in for four minutes on the fourth speed of the mixer (with scraping at one minute).

(10) The beaters and sides of the bowl at room temperature were scraped and the batter was poured into the loaf pan.

(11) The loaf pan was placed in reel oven, and the batter was baked at 325° F. for one hour fifteen minutes.

(12) The loaf pan was removed from the oven; the baked cake was cooled in the pan for thirty minutes; the edges of the cake were loosened with a spatula.

(13) The cake was turned out on a wire rack and then cooled.

(14) After being cooled, the cake measurements, pH and moisture were taken and the taste evaluation of the cake was done.

Note: A master blend of the control cake formulation (which was everything but the shortening, eggs and milk) was made by weighing out 382.72 g of the control dry ingredients to equal the dry ingredients of the Invention Cake A formulation.

The results are set out below:

TABLE II

| Items | Control Cake | Invention Cake A |
|---|---|---|
| Cake pH | 7.2 | 7.1 |
| Cake moisture, % | 29.4 | 33.2 |
| Center, inches | 3.03 inches | 2.61 |
| Center Edge, inches | 2.42 inches | 1.91 |
| Peak | 0.61 inch | 0.70 inch |
| Corner, inches | 1.83 inches | 1.52 |
| Crack Length, inches | 5.75 inches | 2.75 |
| Milk Temperature | 68° F. | 68° F. |
| Egg Temperature | 68° F. | 68° F. |
| Batter Temperature | 70° F. | 70° F. |

The pH of each baked cake was measured by measuring the pH of a slurry obtained by crushing a sample and distributing it in distilled water to obtain a slurry which is 10 percent by weight of solids. The sodium content of each baked cake was measured by atomic absorption.

The observations for this example are: The control batter was whiter, thicker, and showed more volume when put into the loaf pan. The invention batter was yellow, thinner, and tasted much sweeter than the control batter. The control finished-cake appearance was very good and had a high nice crack. The invention cake showed lower volume, had a not-very defined crack (series of small cracks), and had a slightly lighter color. The invention cake showed pulling away from the sides of the pan—the control cake did not. But the invention cake actually stuck more to the sides of the pan. The control cake had a nice, even cell structure. The invention cake had a very small cell structure, and was dense, moister and sweeter tasting. The invention cake made the control cake taste salty in comparison.

The specifications, based on a 17 ounce cake are:

TABLE III

| Items | Specifications | Range (+ ⅛ in.) |
|---|---|---|
| Center | 3.15 inches | 3.00 to 3.25 inches |
| Center Edge | 2.50 inches | 2.35 to 2.65 inches |
| Peak[1] | | 0.85 to 1.10 inch[2] |
| Corner | 2.00 inches | 1.85 to 2.15 inches |
| Crack Length | | 4.00 to 5.00 inches[2] |

Notes:
[1]The peak is the difference between the center and center edge measurements.
[2]The range shown are based on previous test measurements.

Example 2

Low Sodium Pound Cake

A control pound cake formulation (termed "control cake") and a low sodium cake formulation according to the invention (termed "invention cake B") were prepared having the following constituents:

TABLE IV

| Ingredients | Control Cake[1] (grams per cake) | Invention Cake B (grams per cake) |
|---|---|---|
| Flour | 171.46 | 174.18 |
| Sugar, fine granulated | 180.49 | 180.49 |
| Shortening | 87.23 | 87.23 |
| Spice Blend | | |
| Salt | 4.54 | — |
| Wheat Starch, gelatinized | 4.54 | 4.54 |
| Vanilla Flavorant | 2.63 | 2.63 |
| Baking Soda, granulated | 1.13 | — |
| Sodium Acid Pyrophosphate | 1.04 | 0.34 |
| Coated Monocalcium Phosphate | 0.54 | 1.24 |
| $K_2CO_3$, fine granular | — | 0.98 |
| KCl | — | 2.72 |
| Ammonium Bicarbonate | — | 0.50 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention B formulation. The objects of this example were: to produce a low sodium pound cake by replacing the baking soda with 87 percent of $K_2CO_3$ (based on the baking soda) and the salt with 1.6 percent of KCl (based on the flour), reducing the sodium acid pyrophosphate to 0.2 percent (based on the flour) and increasing the coated monocalcium phosphate to 0.7 percent (based on the flour); and to increase the volume by adding 0.3 percent of ammonium bicarbonate (based on flour). The specifications were the same as in Example 1.

The results are set out below:

TABLE V

| Items | Control Cake | Invention Cake B |
|---|---|---|
| Milk Temperature | 70° F. | 70° F. |
| Egg Temperature | 70° F. | 70° F. |
| Batter Temperature | 71° F. | 71° F. |
| Oven Used/Temperature | reel/345° F. | reel/345° F. |
| Time Baked | 1 hour | 1 hour |
| Cake pH | 7.15 | 7.6 |
| Cake Moisture, % | 32.2 | 31.6 |
| Center | 3.04 inches | 3.04 inches |
| Center Edge | 2.13 inches | 2.09 inches |
| Peak | 0.91 inch | 0.95 inch |
| Corner | 1.54 inches | 1.49 inches |
| Crack Length | 4.48 inches | 4.38 inches |
| Volume (rapeseed) | 1443 cc | 1393 cc |
| Specific Gravity, g/cc | 0.846 g/cc | 0.821 g/cc |
| Weight of Batter in the Pan | 687 g | 687 g |
| Sodium, mg/100 g | 364 (001.7)[1] | 54.6 (30.2)[1] |
| Potassium, mg/100 g | 90.2 (49.0)[1] | 362 (200.5)[1] |

Note:
[1] Mg per 55.4 gram serving.

The observations for this example are: The invention cake B batter looked exactly like the control batter. The finished invention cake B had good volume, slight flapping on the sides, sides 4mm narrower than the control cake, and the sides pulled away (the cake contracted). For invention cake B, the crust color was darker, browner than the control cake (a higher pH) and the crack was slightly browned. For invention cake B, the flavor was pretty good, slightly sweet, the texture was good, and the cell structure was not quite as well developed. The flavor of invention cake B was a little flat, with not as much flavor as the control cake. But nothing was objectionable about invention cake B.

Example 3

Low Sodium Pound Cake

A control pound cake formulation (termed "control cake") and a low sodium cake formulation according to the invention (termed "invention cake C") were prepared having the following constituents:

TABLE VI

| Ingredients | Control Cake[1] (grams per cake) | Invention Cake C (grams per cake) |
|---|---|---|
| Flour | 171.46 | 174.18 |
| Sugar, fine granulated | 180.49 | 180.49 |
| Shortening | 87.23 | 87.23 |
| Spice Blend | | |
| Salt | 4.54 | 0.18 |
| Wheat Starch, gelatinized | 4.54 | 4.54 |
| Vanilla Flavorant | 2.63 | 2.63 |
| Baking Soda, granulated | 1.13 | — |
| Sodium Acid Pyrophosphate | 1.04 | 0.17 |
| Coated Monocalcium Phosphate | 0.54 | 1.24 |
| $K_2CO_3$, fine granular | — | 0.75 |
| KCl | — | 2.72 |
| Ammonium Bicarbonate | — | 0.50 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention C formulation. The objects of this example were: to produce a low sodium pound cake by replacing the baking soda with 66 percent of $K_2CO_3$ (based on the baking soda) and the salt with 1.6 percent of KCl (based on the flour), reducing the sodium acid pyrophosphate to 0.1 percent (based on the flour) and increasing the coated monocalcium phosphate to 0.7 percent (based on the flour); and to increase the volume by adding 0.3 percent of ammonium bicarbonate (based on the flour). Also kept in 3.9 percent of salt for flavor and reduced supplement level. The specifications were the same as in Example 1.

The results are set out below:

TABLE VII

| Items | Control Cake | Invention Cake C |
|---|---|---|
| Milk Temperature | 70° F. | 70° F. |
| Egg Temperature | 70° F. | 70° F. |
| Batter Temperature | 72° F. | 72° F. |
| Oven Used/Temperature | reel/325° F. | reel/325° F. |
| Time Baked | 1 hour 8 min. | 1 hour 8 min. |
| Cake pH | 7.1 | 7.4 |
| Cake Moisture, % | 30.8 | 31.4 |
| Center | 2.98 inches | 2.86 inches |
| Center Edge | 2.16 inches | 2.07 inches |
| Peak | 0.82 inch | 0.79 inch |

TABLE VII-continued

| Items | Control Cake | Invention Cake C |
|---|---|---|
| Corner Crack Length | 1.55 inches broken, 3.20 inches | 1.43 inches broken, 3.16 inches |
| Volume (rapeseed) | 1431.7 cc | 1348.3 cc |
| Specific Gravity, g/cc | 0.847 g/cc | 0.837 g/cc |
| Weight of Batter in the Pan | 690 g | 690 g |
| Sodium, mg/100 g | 361 (200)[1] | 56.2 (31.13)[1] |
| Potassium, mg/100 g | 88.4 (49)[1] | 336 (186)[1] |

Note:
[1] Mg per 55.4 gram serving.

The observations for this example are: The control and invention cake C batters were very close in appearance. The finished invention cake C contracted after being taken out of the oven, pulled away from the sides, and the sides bubbled, i.e., flappy. Invention cake C was accordingly narrower. The crust color of invention cake C was slightly darker. Because of lower temperatures, the cracks were not good - there were a series of small cracks on both the control cake and the invention cake C.

Example 4

Low Sodium Pound Cake

A control pound cake formulation (termed "control cake") and a low sodium cake formulation according to the invention (termed "invention cake D") were prepared having the following constituents:

TABLE VIII

| Ingredients | Control Cake[1] (grams per cake) | Invention Cake D (grams per cake) |
|---|---|---|
| Flour | 171.46 | 174.18 |
| Sugar, fine granulated | 180.49 | 180.49 |
| Shortening | 87.23 | 87.23 |
| Spice Blend | | |
| Salt | 4.54 | 0.18 |
| Wheat Starch, gelatinized | 4.54 | 4.54 |
| Vanilla Flavorant | 2.63 | 2.63 |
| Baking Soda, granulated | 1.13 | — |
| Sodium Acid Pyrophosphate | 1.04 | 0.17 |
| Coated Monocalcium Phosphate | 0.54 | 1.5 |
| $K_2CO_3$, fine granular | — | 0.75 |
| KCl | — | 2.27 |
| Ammonium Bicarbonate | — | 0.50 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention D formulation. The objects of this example were: to produce a low sodium pound cake by replacing the baking soda with 66 percent of the $K_2CO_3$ (based on the baking soda level) and the salt with 50 percent w/w of KCl (1.3 percent based on the flour), reducing the sodium acid pyrophosphate to 0.1 percent (based on the flour) and increasing the coated monocalcium phosphate to 0.9 percent (based on the flour); and to increase the volume by adding 0.3 percent of ammonium bicarbonate (based on the flour). Also kept in 3.9 percent of salt for flavor and reduced sodium acid pyrophosphate level. The specifications were the same as in Example 1. The results are set out below:

TABLE IX

| Items | Control Cake | Invention Cake D |
|---|---|---|
| Milk Temperature | 70° F. | 70° F. |
| Egg Temperature | 70° F. | 70° F. |
| Batter Temperature | 71° F. | 71° F. |
| Oven Used/Temperature | reel/325° F. | reel/325° F. |
| Time Baked | 1 hr. 15 min. | 1 hr. 15 min. |
| Cake pH | 7.2 | 7.3 |
| Cake Moisture, % | 31.8 | 31.4 |
| Center | 2.92 inches | 2.86 inches |
| Center Edge | 2.14 inches | 1.97 inches |
| Peak | 0.78 inch | 0.89 inch |
| Corner | 1.52 inches | 1.53 inches |
| Crack Length | 2.03 inches | 2.16 inches |
| Volume (rapeseed) | 1389 cc | 1332 cc |
| Specific Gravity, g/cc | 0.854 g/cc | 0.814 g/cc |
| Weight of Batter in Each Pan | 698 g | 698 g |
| Sodium, mg/100 g | 354 (196.12)[1] | 58.4 (32.35)[1] |
| Potassium, mg/100 g | 89.6 (49.6)[1] | 303 (167.86)[1] |

The observations for this example are: The invention cake D batter was slightly thicker than the control batter and the color was the same. Invention cake D pulled away from the sides of the pan after taking out of the oven. For invention cake D, the top sides were flappy, the sides were peeling (a wet crumb), had a slightly browner crust, had less volume on the sides, and was less broad. For invention cake D, the flavor was a little bland. Invention cake D lacked balanced flavor as in the control cake due to lack of salt, was slightly sweet, had texture and cell structure that looked good, and had a moist mouth feel. All in all, the flavor texture of invention cake D was pretty good, but invention cake D lacked the well rounded flavor of the control cake. Also, there was a need to improve the height and appearance, and to prevent shrinkage of invention cake D.

Example 5

Low Sodium Pound Cake

A control pound cake formulation (termed "control cake") and a low sodium cake formulation according to the invention (termed "invention cake E") were prepared having the following constituents:

TABLE X

| Ingredients | Control Cake[1] (grams per cake) | Invention Cake E (grams per cake) |
|---|---|---|
| Flour | 171.46 | 174.18 |
| Sugar, fine granulated | 180.49 | 180.49 |
| Shortening | 87.23 | 87.23 |
| Spice Blend | | |
| Salt | 4.54 | 0.18 |
| Wheat Starch, gelatinized | 4.54 | 4.54 |
| Vanilla Flavorant | 2.63 | 2.63 |
| Baking Soda, granulated | 1.13 | — |
| Sodium Acid Pyrophosphate | 1.04 | 0.20 |
| Coated Monocalcium Phosphate | 0.54 | 1.75 |
| $K_2CO_3$, fine granular | — | 0.98 |
| KCl | — | 2.27 |
| Ammonium Bicarbonate | — | 0.30 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention E formulation. The objects of this example were: to produce a low sodium pound cake by replacing the baking soda with 87 percent of the soda level with $K_2CO_3$ (0.6 percent based on the flour) and the salt with 50 percent of the salt level with KCl (1.3 percent based on the flour), reducing the sodium acid pyrophosphate to 0.11 percent (based on the flour) and increasing the coated monocalcium phosphate to 1.0 percent (based on the flour); and to increase the volume by adding 0.17 percent of ammonium bicarbonate (based on the flour). Also left in 3.9 percent of salt (of salt level), or 0.1 percent based on flour, for flavor. The specifications were the same as in Example 1.

The results are set out below:

TABLE XI

| Items | Control Cake | Invention Cake E |
|---|---|---|
| Milk Temperature | 70° F. | 70° F. |
| Egg Temperature | 70° F. | 70° F. |
| Batter Temperature | 70° F. | 70° F. |
| Oven Used/Temperature | reel/345° F. | reel/345° F. |
| Time Baked | 1 hour | 1 hour |
| Cake pH | 7.2 | 7.22 |
| Cake Moisture, % | 30.6 | 32.4 |
| Center | 3.04 inches | 2.94 inches |
| Center Edge | 2.08 inches | 2.00 inches |
| Peak | 0.96 inch | 0.94 inch |
| Corner | 1.53 inches | 1.47 inches |
| Crack Length | 4.24 inches | 3.21 inches |
| Volume (rapeseed) | 1427 cc | 1335 cc |
| Specific Gravity, g/cc | 0.856 g/cc | 0.824 g/cc |
| Weight of Batter in the Pan | 688.7 g | 688.7 g |
| Sodium, mg/100 g | 353 (195.56)[1] (31.69)[1] | 57.2 |
| Potassium, mg/100 g | 94.8 (52.52)[1] (182.27)[1] | 329 |

Note:
[1] Mg. per 55.4 gram serving.

The observations for this example are: The invention cake E batter was slightly thicker than the control batter. The color was the same. The finished invention cake E had nice crust color, golden. Invention cake E pulled away from the sides and had flappy sides but not as much as in Example 4. Invention cake E had less volume on the sides, and had less broad batter top height. One side peeled a little (wet). The crack of invention cake E was V-shaped, but was not as wide or deep as the control cake crack. For invention cake E, the flavor was slightly bland, was slightly sweet, and lacked balanced flavor as in the control cake due to lack of salt. For invention cake E, the texture and cell structure was good and had a slightly moist mouth feel. All in all, the flavor of invention cake E was not bad, but it lacked the well rounded flavor as in the control cake. There was a need to improve the height and appearance of invention cake E and to prevent cake shrinkage.

Example 6

Low Sodium Pound Cake

A control pound cake formulation (termed "control cake") and a low sodium cake formulation according to the invention (termed "invention cake F") were prepared having the following constituents:

TABLE XII

| Ingredients | Control Cake[1] (grams per cake) | Invention Cake F (grams per cake) |
|---|---|---|
| Flour | 171.46 | 172.88 |
| Sugar, fine granulated | 180.49 | 180.49 |
| Shortening | 87.23 | 87.23 |
| Spice Blend | | |
| Salt | 4.54 | 0.18 |
| Wheat Starch, gelatinized | 4.54 | 4.54 |
| Vanilla Flavorant | 2.63 | 2.63 |
| Baking Soda, granulated | 1.13 | 1.13 |
| Sodium Acid Pyrophosphate | 1.04 | 0.20 |
| Coated Monocalcium Phosphate | 0.54 | 0.54 |
| $K_2CO_3$, fine granulated | — | — |
| KCl | — | 2.27 |
| Ammonium Bicarbonate | — | 0.30 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention F formulation. The objects of this example were: to produce a low sodium pound cake by replacing the salt with 50 percent of the salt level with KCl (1.3 percent based on the flour), reducing the sodium acid pyrophosphate to 0.11 percent (0.1 percent based on the flour) and increasing the coated monocalcium phosphate to 0.9 percent (based on the flour); and to increase the volume by adding 0.17 percent of ammonium bicarbonate (based on the flour). Also left in 3.9 percent of salt (of salt level), or 0.1 percent based on the flour, for flavor. The baking soda was left in to see if it improved appearance and/or volume; and if so, then one could ascertain that the alkaline leavening agents should be worked with instead of the acidic leavening agents. The formulation of invention cake F was the same as that of invention cake E except that the baking soda was left in. The specifications were the same as in Example 1.

The results are set out below:

TABLE XIII

| Items | Control Cake | Invention Cake F |
|---|---|---|
| Milk Temperature | 70° F. | 70° F. |
| Egg temperature | 70° F. | 70° F. |
| Batter Temperature | 70° F. | 70° F. |
| Oven Used/Temperature | reel/325° F. | reel/325° F. |
| Time Baked | 1 hr./15 min. | 1 hr./15 min. |
| Cake pH | 7.15 | 7.15 |
| Cake Moisture, % | 31.8 | 32.2 |
| Center | 2.91 inches | 2.86 inches |
| Center Edge | 2.18 inches | 2.21 inches |
| Peak | 0.73 inch | 0.65 inch |
| Corner | 1.57 inches | 1.63 inches |
| Crack Length | 2.19 inches | 2.55 inches (2 cracks side by side) |
| Volume (rapeseed) | 1395 cc | 1406 cc |
| Specific Gravity, g/cc | 0.841 g/cc | 0.777 g/cc |
| Weight of Batter in the Pan | 690 g | 690 g |
| Sodium, mg/100 g | 362 (200.65)[1] (58.72)[1] | 106 |
| Potassium, mg/100 g | 80.2 (44.43)[1] | 233 |

TABLE XIII-continued

| Items | Control Cake | Invention Cake F |
|---|---|---|
|  |  | (129.08)[1] |

Note:
[1] Mg. per 55.4 gram serving

The observations for this example are: The invention cake F batter was thicker than the control volume. The volume of invention cake F was larger than that for the control cake. There was slight flapping on the sides of invention cake F. Invention cake F had a soft texture and a flavor which was sweet, but it was not a balanced flavor.

Example 7

Low Sodium Pound Cake

A control pound cake formulation (termed "control cake") and a low sodium cake formulation according to the invention (termed "invention cake G") were prepared having the following constituents:

TABLE XIV

| Ingredients | Control Cake (grams per cake) | Invnetion Cake G (grams per cake) |
|---|---|---|
| Flour | 171.46 | 172.88 |
| Sugar, fine granulated | 180.49 | 180.49 |
| Shortening | 87.23 | 87.23 |
| Spice Blend |  |  |
| Salt | 4.54 | 0.18 |
| Wheat Starch, gelatinized | 4.54 | 4.54 |
| Vanilla Flavorant | 2.63 | 2.63 |
| Baking Soda, granulated | 1.13 | — |
| Sodium Acid Pyrophosphate | 1.04 | 0.20 |
| Coated Monocalcium Phosphate | 0.54 | 1.75 |
| $K_2CO_3$, fine granular | — · | — |
| KCl | — | 2.27 |
| Ammonium Bicarbonate | — | 0.30 |
| Potassium Bicarbonate | — | 1.13 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention G formulation. The objects of this example were to produce a low sodium pound cake using the formula of Example 6 except with the baking soda being replaced with potassium bicarbonate. The specifications were the same as in Example 1.

The results are set out below:

TABLE XV

| Items | Control Cake | Invention Cake G |
|---|---|---|
| Milk Temperature | 70° F. | 70° F. |
| Egg Temperature | 70° F. | 70° F. |
| Batter Temperature | 70° F. | 70° F. |
| Oven Used/Temperature | reel/345° F. | reel/345° F. |
| Time Baked | 1 hr. | 1 hr. |
| Cake pH | 7.15 | 7.00 |
| Cake Moisture, % | 31.4 | 32.0 |
| Center | 3.04 inches | 2.97 inches |
| Center Edge | 2.07 inches | 1.98 inches |
| Peak | 0.97 inch | 0.99 inch |
| Corner | 1.45 inches | 1.43 inches |

TABLE XV-continued

| Items | Control Cake | Invention Cake G |
|---|---|---|
| Crack Length | 3.64 inches | 4.16 inches |
| Volume (rapeseed) | 1398 cc | 13 |
| Corner Pan | 1.45 inches | 1.43 inches |
| Sodium, mg/100 g | 355 (196.67)[1] | 58.0 (32.13)[1] |
| Potassium, mg/100 g | 77.8 (43.10)[1] | 306 (169.52)[1] |

The observations for this example are: The invention cake G batter was thicker than the control batter. The color was comparable. The finished invention G cake had good volume, nice color, a wide crack, which was less V-shaped than in the past, and slight flapping of the sides. For invention cake G, the flavor was slightly sweet, there was a moist feeling in the mouth and there was a slightly odd note in the flavor, not balanced in flavor.

Example 8

Low Sodium Pound Cake

A control pound cake formulation (termed "control cake") and a low sodium cake formulation according to the invention (termed "invention cake H") were prepared having the following constituents:

TABLE XVI

| Ingredients | Control Cake[1] (grams per cake) | Invention Cake H (grams per cake) | Invention Cake H (percent based on the flour) |
|---|---|---|---|
| Flour | 171.46 | 172.88 | — |
| Sugar, fine granulated | 180.49 | 180.49 | 104.0 |
| Shortening | 87.23 | 87.23 | 50.42 |
| Spice Blend |  |  |  |
| Salt | 4.54 | 0.18 | 0.104 |
| Wheat Starch, gelatinized | 4.54 | 4.54 | .2.63 |
| Vanilla Flavorant | 2.63 | 2.63 | 1.52 |
| Baking Soda, granulated | 1.13 | 0.20 | 0.115 |
| Sodium Acid Pyrophosphate | 1.04 | — | — |
| Coated Monocalcium Phosphate | 0.54 | 1.75 | 1.01 |
| KCl | — | 2.27 | 1.31 |
| Ammonium Bicarbonate | — | 0.30 | 0.17 |
| Potassium Bicarbonate | — | 1.13 | 0.65 |

Note:
[1] Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention H formulation. The objects of this example were to produce a low sodium pound cake using the sodium acid pyrophosphate. The specifications were the same as in Example 1.

The results are set out below:

TABLE XVII

| Items | Control Cake | Invention Cake H |
|---|---|---|
| Milk Temperature | 70° F. | 70° F. |
| Egg Temperature | 70° F. | 70° F. |
| Batter Temperature | 70° F. | 70° F. |
| Oven Used/Temperature | reel/325° F. | reel/325° F. |
| Time Baked | 1hr./15 min. | 1 hr./15 min. |

TABLE XVII-continued

| Items | Control Cake | Invention Cake H |
|---|---|---|
| Cake pH | 7.12 | 7.18 |
| Cake Moisture, % | 31.2 | 31.4 |
| Center | 2.90 inches | 2.92 inches |
| Center Edge | 2.20 inches | 2.10 inches |
| Peak | 0.70 inch | 0.82 inch |
| Corner | 1.55 inches | 1.56 inches |
| Crack Length | 2.85 inches (2 cracks) | 3.04 inches |
| Volume (rapeseed) | 1386.3 cc | 1381.3 cc |
| Specific Gravity, g/cc | 0.832 g/cc | 0.776 g/cc |
| Weight of Batter in the Pan | 684 g | 684 g |
| Sodium, mg/100 g | 356 (197.22)[1] | 65.8 (36.45)[1] |
| Potassium, mg/100 g | 78.4 (43.43)[1] | 280 (155.12)[1] |

The observations for this experiment are: The invention cake H batter is thicker than the control batter, but is comparable in color. Finished invention cake H has an excellent crack which is longer and wider than that of the control cake. Invention cake H has a nice crust, good volume and an open cell structure. Some in-house tasters thought that the flavor of invention cake H was close to that of the control cake, while others thought that there was a big difference, much sweeter. Some preferred the control cake. Invention cake H pulled away from the sides of the pan and there was a slight flapping of the sides.

Example 9

Low Sodium Pound Cake

A control pound cake formulation (termed "control cake") and a low sodium cake formulation according to the invention (termed "invention cake I") were prepared having the following constituents:

TABLE XVIII

| Ingredients | Control Cake[1] (grams per cake) | Invention Cake I (grams per cake) |
|---|---|---|
| Flour | 171.46 | 172.88 |
| Sugar, fine granulated | 180.49 | 180.49 |
| Shortening | 87.23 | 87.23 |
| Spice Blend | | |
| Salt | 4.54 | 0.18 |
| Wheat Starch, gelatinized | 4.54 | 4.54 |
| Vanilla Flavorant | 2.63 | 2.63 |
| Baking Soda, granulated | 1.13 | 0.20 |
| Sodium Acid Pyrophosphate | 1.04 | — |
| Coated Monocalcium Phosphate | 0.54 | 1.75 |
| KCl | — | 2.27 |
| $K_2CO_3$ | — | 0.78 |
| Ammonium Bicarbonate | — | 0.30 |

Note:
[1]Based on a 393.45 gram master mix.

The procedure used was the one-step mixing procedure set out in Example 1, with the KCl, $K_2CO_3$ and ammonium bicarbonate being added to the spice blend in dry form. Two mixers were used side by side, simultaneously mixing the control formulation and the invention I formulation. The objects of this example were to produce a low sodium pound cake by using the formulation of Example 8 but with replacement of the potassium bicarbonate with $K_2CO_3$ (69 percent of the potassium bicarbonate level). Such level was arrived at because 87 percent (0.98 g) normally was used to get a good pH. The baking soda level (0.20 g) used was to provide 0.78 g of $K_2CO_3$, which is 69 percent.

The results are set out below:

TABLE XIX

| Items | Control Cake | Invention Cake I |
|---|---|---|
| Temperature | 70° F. | 70° F. |
| Egg Temperature | 70° F. | 70° F. |
| Batter Temperature | 71° F. | 71° F. |
| Oven Used/Temperature | reel/330° F. | reel/330° F. |
| Time Baked | 1 hr./11 min. | 1 hr./11 min. |
| Cake pH | 7.1 | 7.05 |
| Cake Moisture, % | 31.8 | 31.6 |
| Center | 2.96 inches | 2.88 inches |
| Center Edge | 2.17 inches | 2.07 inches |
| Peak | 0.79 inch | 0.81 inch |
| Corner | 1.50 inches | 1.44 inches |
| Crack Length | 2.66 inches | 1.91 inches |
| Volume (rapeseed) | 1373 cc | 1293 cc |
| Specific Gravity, g/cc | 0.851 | 0.817 |
| Weight of Batter in the Pan | 689 g | 689 g |
| Sodium, mg/100 g | — | 81.5 (45.15)[1] |
| Potassium, mg/100 g | — | 295 (163)[1] |

Note:
[1]Mg. per 37 gram serving.

The observations for this example are: Invention cake I had a slightly thicker batter, but the color was comparable. Finished invention cake I had a pretty good surface appearance, its crust was slightly darker and its crack was pretty good in appearance—not long though. But the volume of invention cake I was lower, especially obvious in the corners and the width (girth). Also invention cake I pulled away from the sides of the pan and had slight flapping along the sides. Flavor of invention cake I was bland, making the control cake taste salty in comparison. The texture of invention cake I seemed to be a little closer to the control cake than the cake of Example 8, but it still sort of rolled up in the mouth.

Example 10

Low Sodium Pound Cake

A control pound cake formulation (termed "control cake") and a low sodium cake formulation according to the invention (termed "invention cake K") were prepared having the following constituents:

TABLE XX

| Ingredients | Control Cake[1] (grams per cake) | Invention Cake K (grams per cake) |
|---|---|---|
| Flour | 171.46 | 172.58 |
| Sugar, fine granulated | 180.49 | 180.49 |
| Shortening | 87.23 | 87.23 |
| Spice Blend | | |
| Salt | 4.54 | 0.48 |
| Wheat Starch, gelatinized | 4.54 | 4.54 |
| Vanilla Flavorant | 2.63 | 2.63 |
| Baking Soda, granulated | 1.13 | 0.20 |
| Sodium Acid Pyrophosphate | 1.04 | — |
| Coated Monocalcium Phosphate | 0.54 | 1.75 |
| KCl | — | 2.27 |
| Ammonium Bicarbonate | — | 0.30 |
| Potassium Bicarbonate | — | 1.13 |

Note:
[1]Based on a 393.45 gram master mix.

The procedure used was the one-step mixing procedure set out in Example 1, with the KCl, K₂CO₃ and ammonium bicarbonate being added to the spice blend in dry form. Two mixers were used side by side, simultaneously mixing the control formulation and the invention K formulation. The objection of the example were to produce a low sodium pound cake. The serving size for the low sodium pound cake has been reduced, so more salt can be added for flavor while still obtaining 35 mg of Na per serving. The specifications were the same as in Example 1.

The results are set out below:

TABLE XXI

| Items | Control Cake | Invention Cake K |
|---|---|---|
| Milk Temperature | 70° F. | 70° F. |
| Egg Temperature | 70° F. | 70° F. |
| Batter Temperature | 71° F. | 71° F. |
| Oven Used/Temperature | reel/325° F. | reel/325° F. |
| Time Baked | 1 hr./15 min. | 1 hr./15 min. |
| Cake pH | 7.1 | 7.1 |
| Specific Gravity, g/cc | 0.85 | 0.79 |
| Weight of Batter in the Pan | 687 g | 687 g |
| Sodium, mg/100 g | — | 94.9 (38.11)[1] |
| Potassium, mg/100 g | — | 294 (108.78)[1] |

Note:
[1] Mg. per 37 gram serving.

The following is a listing of the percentages of the ingredients of the control cake versus the percentages of the ingredients of invention cake K:

TABLE XXII

| | Control Cake, grams | Control Cake, percent based on flour | Control Cake, percent based on whole | Invention Cake K, grams | Invention Cake K, percent based on flour | Invention Cake K, percent based on whole |
|---|---|---|---|---|---|---|
| Flour | 171.46 | 100.00 | 37.8 | 172.58 | 100.00 | 38.0 |
| Sugar, fine granulated | 180.49 | 105.26 | 39.8 | 180.49 | 104.58 | 39.8 |
| Shortening | 87.23 | 50.88 | 19.27 | 87.23 | 50.54 | 19.27 |
| Spice Blend | | | | | | |
| Salt | 4.54 | 2.65 | 1.00 | 0.48 | 0.28 | 0.11 |
| Wheat Starch, gelatinized | 4.54 | 2.65 | 1.00 | 4.54 | 2.63 | 1.00 |
| Vanilla Flavorant | 2.63 | 1.53 | 0.58 | 2.63 | 1.52 | 0.58 |
| Baking Soda, granulated | 1.13 | 0.66 | 0.25 | 0.20 | 0.12 | 0.04 |
| Sodium Acid Pyrophosphate | 1.04 | 0.61 | 0.23 | — | — | — |
| Coated Monocalcium Phosphate | 0.54 | 0.31 | 0.12 | 1.75 | 1.01 | 0.39 |
| KCl | — | — | — | 2.27 | 1.32 | 0.50 |
| Ammonium Bicarbonate | — | — | — | 0.30 | 0.17 | 0.07 |
| Potassium Bicarbonate | — | — | — | 1.13 | 0.65 | 0.25 |

The observations for this example are: The invention cake K batter color is comparable to that of the control cake batter, but it is slightly thicker. The finished invention cake K has good volume (looks slightly bigger than the control cake—larger girth) and good color but no well defined crack though. The cell structure looked good and was comparable to the control cake. Response to the flavor of invention cake K was mixed; some of the in-house testers said that it tasted good. Some of the in-house testers said that the flavor was bland, slightly too sweet. Some others could not tell the difference. Response to the texture was mixed; some thought the texture was close to that of the cake, while others said the texture was pasty. Invention cake K pulled away from the sides of the pan.

Example 11

Low Sodium White Layer Cake

A control white layer cake formulation (termed "control cake") and a low sodium white layer cake formulation according to the invention (termed "invention cake L") were prepared having the following constituents:

TABLE XXIII

| | Control Cake[1] | | Invention Cake L (grams per cake) |
|---|---|---|---|
| | | (grams per cake) | |
| Flour | 2¼ 1/4 cups | 255.15 g | 260.57 g |
| Sugar, fine granulated | 1½ cups | 302.40 g | 302.40 g |
| Baking Powder | 3¼ tspns. | 14.35 g | — |
| Salt | 1 tspn. | 5.42 g | — |
| Shortening | ½ cup | 89 g | 89 g |
| Milk | 1 cup | 246 g | 246 g |
| Egg Whites | 4 | 130.2 g | 130.2 g |
| Vanilla Extract | 1 tspn. | 4.1 g | 4.1 g |
| K₂CO₃, fine granular | — | — | 380 g |
| Ammonium Bicarbonate | — | — | 1.46 g |
| Coated Monocalcium Phosphate | — | — | 8.55 g |
| Sodium Bicarbonate | — | — | 0.97 g |

Note:
[1] Based on a 393.45 gram master mix.

The procedure used was as follows:
(1) The flour, sugar, baking powder (or other leavening agents as in sample) and salt were sifted together into a large mixing bowl.
(2) The composition was mixed for 8 minutes on the first speed of an electric mixer.
(3) The shortening was cut in with a knife, then mixed in using the second speed of the mixer for 7 minutes.
(4) Milk was added and mixed in using the first speed of the mixer for 1½ minutes after dampening.

(5) Egg whites and vanilla were added and mixed in using the first speed of the mixer for another 1½ minutes.
(6) The batter was poured into two greased-and-floured 9-inch cake pans.
(7) The cake was baked in a 350° F. oven for 25 to 30 minutes until the cake shrank back when lightly touched in the center. The cake was removed from the oven and cooled for 5 minutes in pans before being turned out on cake racks. The cake was covered with cloth until cooled.

Two mixers were used side by side, simultaneously mixing the control formulation and the invention L formulation. The object of this example was to apply the invention low sodium leavening system to a white layer cake using the system from invention dromedary pound cake K of Example 10.

The results are set out below:

TABLE XXIV

| Items | Control Cake[2] | Invention Cake L[3] |
|---|---|---|
| Wt. of Cake Pan | 163.99 g | 146.04 g |
| Wt. of Batter And Cake Pan | 674.99 g | 657.04 g |
| Batter Weight | 511 g[1] | 511 g[1] |
| Wt. of Mixing Bowl | 538.28 g | 552.85 g |
| Wt. of Batter And Mixing Bowl | 1560.00 g | 1584.00 g |
| Total Batter Weight | 1021.72 g | 1031.15 g |
| Finished Cake Weight | 469.91 g | 473.27 g |
| Milk Temperature | 70° F. | 70° F. |
| Egg Temperature | 70° F. | 70° F. |
| Oven Used/Temperature | reel/350° F. | reel/350° F. |
| Time Baked | 29 min. | 29 min. |
| Cake pH | 7.82 | 7.61 |
| Cake Moisture, % | 27.0 | 29.2 |
| Center | 1.28 inches | 1.20 inches |
| Center Edge, 4 sides of cake | 1.02 inches | 1.15 inches |
| Peak | — | — |
| Specific Gravity, g/cc | 0.924 g/cc | 0.932 g/cc |
| Volume (rapeseed) | — | — |
| Sodium, mg/100 g | 387 | 72 |
| Potassium, mg/100 g | 84 | 294 |

Notes:
[1] As only one layer was made, the batter was divided in half.
[2] Baking Powder was 5.6 percent, based on the flour, in the control.
[3] Leavening was 5.7, based on the flour, in the invention cake L formulation. It was 0.17 percent higher than in the invention cake K formulation.

The observations for this example are: The invention cake L batter turned yellow after adding in the milk, whereas the control batter was white. It also had a somewhat strong smell of ammonia. After adding eggs, the invention cake L batter appeared thinner than the control batter. The invention cake L slowly started to lighten; by the time it was poured into the pans, it was the same color as the control batter. The invention cake L batter seemed slightly thicker than control batter and somewhat sticky (it had the consistency of egg whites). After invention cake L baked about ten minutes, its volume was higher than the control cake, but its surface did not appear smooth and looked sort of holey. At 20 minutes, invention cake L was already very browned, whereas the control cake was still quite blond. Baked invention cake L appeared to have a skin on top: brown, shiny, sheen. The outside ring of invention was somewhat lighter. After invention cake L cooled, very small brown veins were noticed across the top of the cake. Also, after invention cake L cooled, it felt harder and spongier than the control cake (whereas right after it came out of the oven it felt much softer; top crust was softer too). The top of invention cake L looked sort of shriveled and wrinkly. Invention cake L had a very coarse, open texture, sort of like corn bread. The flavor of the two cakes were comparable, with invention cake L slightly sweeter.

Example 12

Low Sodium White Layer Cake

A control pound cake formulation (termed "control cake") and a low sodium cake formulation according to the invention (termed "invention cake M") were prepared having the following constituents:

TABLE XXXV

| Ingredients | Control Cake (grams per cake) | Invention Cake M (grams per cake) |
|---|---|---|
| Flour | 255.15 | 260.57 |
| Sugar, fine granulated | 302.40 | 302.40 |
| Baking powder, double acting | 14.35 | — |
| Salt | 5.42 | — |
| Shortening | 89 | 89 |
| Milk | 246 | 246 |
| Egg Whites | 130.2 | 130.2 |
| Vanilla Extract | 4.1 | 4.1 |
| $K_2CO_3$, fine granular | — | 3.8 |
| Ammonium Bicarbonate | — | — |
| Coated Monocalcium Phosphate | 8.55 | — |
| Sodium Bicarbonate | — | 0.97 |

The procedure of Example 11 was used, except that the mixing time in step (4) was increased from 1½ minutes to 2½ minutes. The object of this example was to apply the invention low sodium leavening system to white layer cake and to remove the ammonium bicarbonate to see if the browning reaction would be eliminated.

The results are set out below:

| Items | Control Cake | Invention Cake M |
|---|---|---|
| Wt. of Cake Pan | 163.99 g | 146.04 g |
| Wt. of Batter and Cake Pan | 674.94 g | 657.04 g |
| Batter Weight | 511.00 g | 511.00 g |
| Wt. of Mixing Bowl | 538.28 g | 552.85 g |
| Wt. of Batter and Mixing Bowl | 1558.60 g | 1575.60 g |
| Total Batter Weight | 1020.32 g | 1022.75 g |
| Finished Cake Weight | Note 1 | 423.7 g |
| Milk Temp. | 70° F. | 70° F. |
| Egg Temp. | 70° F. | 70° F. |
| Batter Temp. | 72° F. | 72° F. |
| Oven Used/Temp. | reel/350° F. | reel/350° F. |
| Time Baked | 29 minutes | 29 minutes |
| Cake pH | 7.75 | 7.10 |
| Cake Moisture, % | 30.4 | 26.0 |
| Center | Note 1 | 1.27 inches |
| Center Edge, 4 sides of cake | 1.00 inch | 0.93 inch |
| Peak | | |
| Specific Gravity, g/cc | 0.920 g/cc | 0.969 g/cc |
| Volume (rapeseed) | | |
| Sodium, mg/100 g | 390 | 74 |
| Potassium, mg/100 g | 88 | 294 |

Note:
1. Could not be obtained because part of cake stuck to the pan.

Observations for this example are: The invention cake M batter still turned yellow after adding the milk (as in Example 11) and turned white again by the time it was poured into the pan. The invention cake M batter seems thicker than the control batter. The finished invention cake M cake looked good and its crust color was slightly lighter (paler) than the finished control cake. But other than that, the two cakes look comparable and their volume and surface texture looked similar. There was problems getting both cakes out of the pans (even though they were greased and floured). Wax paper would help. Invention cake M had a flavor comparable to the control cake and had a good texture.

The above examples illustrate that the best mode of preparing a low sodium pound cake is that of invention cake H wherein about 0.1 percent of salt, 0.115 percent of sodium bicarbonate, 1.01 percent of monocalcium phosphate, 0.65 percent of potassium bicarbonate and 0.17 percent of ammonium bicarbonate are used. Invention cake A depicted the effects of using only potassium carbonate, monocalcium phosphate and no salt, whereas the other samples illustrate the effects of various additions or substitutions from the control cake used therein. Invention cake B showed a reduced amount of sodium acid pyrophosphate, and an increased amount of monocalcium phosphate as compared to the subject control cake along with potassium carbonate and ammonium bicarbonate and the absence of salt. Invention cake C had reduced potassium carbonate and some salt.

What is claimed is:

1. Low sodium cake mix comprising a shortening portion, a non-shortening portion and a leavening portion, the leavening portion comprising a basic leavening agent comprising potassium carbonate, and an edible acidic leavening agent, such that, upon baking of the cake mix, the acidic leavening agent will react with the basic leavening agent to liberate carbon dioxide and thereby leaven the cake mix, the two types of leavening agents being present in such a balanced proportion that after baking the pH of the resultant cake product is in the range of about 6.8 to about 7.5.

2. Cake mix as claimed in claim 1 wherein the acidic leavening agent is calcium monophosphate.

3. Cake mix as claimed in claim 1 wherein the potassium carbonate is in granulated form.

4. Cake mix as claimed in claim 1 wherein about 80 to 90 percent by weight, with respect to the weight of the sodium bicarbonate normally used, of potassium carbonate is present.

5. Cake mix as claimed in claim 1 wherein the pH of the resultant cake product is 7 to 7.2.

6. Cake mix as claimed in claim 1 wherein sufficient salt in the form of sodium chloride is present to improve the flavor of the resultant cake product therefrom and up to 0.2 percent by weight of ammonium bicarbonate is present to improve the volume of the resultant cake product therefrom.

7. Cake mix as claimed in claim 1 wherein up to 0.15 percent by weight of sodium bicarbonate is present to improve the volume as well as texture of the resultant cake product therefrom.

8. Cake mix as claimed in claim 1 wherein the total sodium in the resultant cake product therefrom is less than 35 mg per serving thereof.

9. Cake mix as claimed in claim 1 wherein the total sodium in the resultant cake produce therefrom is less than 25 mg per 14.2 g serving thereof.

10. Cake mix as claimed in claim 1 wherein the basic leavening agent is encapsulated potassium carbonate.

11. Method of making a low sodium cake from a cake mix precursor comprising a shortening portion and a non-shortening portion, said method comprising:

(a) sufficiently mixing the non-shortening portion of the cake mix precursor to achieve thorough mixing thereof;
(b) admixing mixture (a) with the leavening portion of the cake mix precursor, the leavening portion comprising a basic leavening agent comprising potassium carbonate, and an edible acidic leavening agent, such that, upon baking of the cake mix, the acidic leavening agent will react with the basic leavening agent to liberate carbon dioxide and thereby leaven the cake mix, the two types of leavening agents being used in such a balanced proportion that after baking the pH of the resultant cake product is in the range of about 6.8 to about 7.5;
(c) admixing mixture (b) with the shortening portion of the cake mix precursor, eggs and milk, thereby preparing a cake batter; and
(d) baking the cake batter for a sufficient time and at a sufficient temperature to cause the basic leavening agent to react with the acidic leavening agent and liberate carbon dioxide and thereby leaven the cake mix, and to provide the low sodium cake having a pH in the range of about 6.8 to about 7.5.

12. Method as claimed in claim 11 wherein the acidic leavening agent is calcium monophosphate.

13. Method as claimed in claim 11 wherein the mix also contains about 0.15 to 0.25 percent by weight of ammonium bicarbonate.

14. Method as claimed in claim 11 wherein the potassium carbonate has a particle size distribution of about 98 percent by weight being finer than 100 mesh.

15. Low sodium cake mix comprising a shortening portion, a non-shortening portion and a leavening portion, the leavening portion comprising a basic leavening agent comprising potassium carbonate, and an edible acidic leavening agent consisting essentially of calcium monophosphate, such that, upon baking of the cake mix, the acidic leavening agent will react with the basic leavening agent to liberate carbon dioxide and thereby leaven the cake mix, the two types of leavening agents being present in such a balanced proportion that after baking the pH of the resultant cake 16. Cake mix as claimed in claim 15 wherein the potassium carbonate is in granulated form.

17. Cake mix as claimed in claim 15 wherein about 80 to 90 percent by weight, with respect to the weight of the sodium bicarbonate normally used, of potassium carbonate is present. product is in the range of about 6.8 to about 7.5.

18. Method of making a low sodium cake from a cake mix precursor comprising a shortening portion and a non-shortening portion, said method comprising:

(a) sufficiently mixing the non-shortening portion of the cake mix precursor to achieve thorough mixing thereof;
(b) admixing mixture (a) with the leavening portion of the cake mix precursor, the leavening portion comprising a basic leavening agent comprising potassium carbonate, and an edible acidic leavening agent consisting essentially of calcium monophosphate, such that, upon baking of the cake mix, the acidic leavening agent will react with the basic leavening agent to liberate carbon dioxide and thereby leaven the cake mix, the two types of leavening agents being used in such a balanced proportion that after baking the pH of the resultant cake product is in the range of about 6.8 to about 7.5;

(c) admixing mixture (b) with the shortening portion of the cake mix precursor, eggs and milk, thereby preparing a cake batter; and (d) baking the cake batter for a sufficient time and at a sufficient temperature to cause the basic leavening agent to react with the acidic leavening agent and liberate carbon dioxide and thereby leaven the cake mix, and to provide the low sodium cake having a pH in the range of about 6.8 to about 7.5.

* * * * *